United States Patent
Hull et al.

(10) Patent No.: US 11,718,784 B2
(45) Date of Patent: Aug. 8, 2023

(54) REACTIVE HYDRAULIC FRACTURING FLUID

(71) Applicant: Saudi Arabian Oil Company, Dhahran (SA)

(72) Inventors: Katherine Leigh Hull, Houston, TX (US); Rajesh Kumar Saini, Cypress, TX (US); Younane N. Abousleiman, Norman, OK (US); Desmond Schipper, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/707,106

(22) Filed: Mar. 29, 2022

(65) Prior Publication Data

US 2022/0220365 A1    Jul. 14, 2022

Related U.S. Application Data

(62) Division of application No. 16/731,574, filed on Dec. 31, 2019, now Pat. No. 11,339,321.

(51) Int. Cl.
| | |
|---|---|
| *C09K 8/68* | (2006.01) |
| *C09K 8/64* | (2006.01) |
| *C09K 8/70* | (2006.01) |
| *E21B 43/26* | (2006.01) |
| *E21B 43/267* | (2006.01) |

(52) U.S. Cl.
CPC ............... *C09K 8/68* (2013.01); *C09K 8/64* (2013.01); *C09K 8/703* (2013.01); *E21B 43/26* (2013.01); *E21B 43/267* (2013.01)

(58) Field of Classification Search
None
See application file for complete search history.

(56) References Cited

U.S. PATENT DOCUMENTS

| | | |
|---|---|---|
| 830,437 A | 9/1906 | Humphrey |
| 2,900,269 A | 8/1959 | Bauman et al. |
| 3,284,281 A | 11/1966 | Thomas |
| 3,316,965 A | 5/1967 | Watanabe |
| 3,716,387 A | 2/1973 | Simmons et al. |
| 3,807,557 A | 4/1974 | Miller |
| 3,926,575 A | 12/1975 | Meyers |
| 3,977,472 A | 8/1976 | Graham et al. |
| 3,996,062 A | 12/1976 | Frost |
| 4,043,885 A | 8/1977 | Yen et al. |

(Continued)

FOREIGN PATENT DOCUMENTS

| | | |
|---|---|---|
| CA | 2322118 | 12/2007 |
| CN | 101819111 | 12/2011 |

(Continued)

OTHER PUBLICATIONS

U.S. Appl. No. 15/243,312, Chen, filed Aug. 22, 2016.

(Continued)

*Primary Examiner* — Charles R Nold
(74) *Attorney, Agent, or Firm* — Fish & Richardson P.C.

(57) ABSTRACT

Hydraulic fracturing fluids and methods to hydraulically fracture a subterranean formation and oxidize organic material in the subterranean formation. The hydraulic fracturing fluid includes water, another fluid, and a surfactant. An inorganic oxidizer is included in the water.

20 Claims, 6 Drawing Sheets

(56) References Cited

U.S. PATENT DOCUMENTS

| | | |
|---|---|---|
| 4,047,988 A | 9/1977 | Weill |
| 4,195,010 A | 3/1980 | Russell et al. |
| 4,220,550 A | 9/1980 | Frenier et al. |
| 4,223,726 A | 9/1980 | Cha |
| 4,252,189 A | 2/1981 | Bodine |
| 4,289,639 A | 9/1981 | Buske |
| 4,324,560 A | 4/1982 | Fonseca |
| 4,381,950 A | 5/1983 | Lawson |
| 4,444,058 A | 4/1984 | Ratigan |
| 4,480,696 A | 11/1984 | Almond et al. |
| 4,493,875 A | 1/1985 | Beck et al. |
| 4,519,455 A * | 5/1985 | Holtmyer ............... E21B 43/26 166/305.1 |
| 4,554,082 A * | 11/1985 | Holtmyer ............... C09K 8/703 507/261 |
| 4,587,739 A | 5/1986 | Holcomb |
| 4,594,170 A | 6/1986 | Brown et al. |
| 4,627,495 A * | 12/1986 | Harris ................. E21B 43/267 166/280.1 |
| 4,640,692 A | 2/1987 | Audeh |
| 4,681,914 A | 7/1987 | Olson et al. |
| 4,708,805 A | 11/1987 | D'Muhala |
| 4,718,489 A | 1/1988 | Hallam et al. |
| 4,780,223 A | 10/1988 | Baranet et al. |
| 4,830,773 A | 5/1989 | Olson |
| 4,830,779 A | 5/1989 | Maeno et al. |
| 4,864,472 A | 9/1989 | Yoshimura |
| 4,887,670 A | 12/1989 | Lord et al. |
| 5,193,396 A | 3/1993 | Gorski |
| 5,213,705 A | 5/1993 | Olson |
| 5,302,297 A | 4/1994 | Barthrope |
| 5,435,187 A | 7/1995 | Ewy |
| 5,757,473 A | 5/1998 | Kanduth et al. |
| 5,759,964 A | 6/1998 | Shuchart |
| 5,869,750 A | 2/1999 | Onan |
| 5,999,887 A | 12/1999 | Giannakopoulos et al. |
| 6,095,679 A | 8/2000 | Hammiche et al. |
| 6,138,760 A | 10/2000 | Lopez et al. |
| 6,165,295 A | 12/2000 | Wagaman |
| 6,227,295 B1 | 5/2001 | Mitchell et al. |
| 6,349,595 B1 | 2/2002 | Lorenzo et al. |
| 6,411,902 B1 | 6/2002 | Wiltshire |
| 6,488,091 B1 | 12/2002 | Weaver |
| 6,491,425 B1 | 12/2002 | Hammiche et al. |
| 6,494,263 B2 | 12/2002 | Todd |
| 6,516,080 B1 | 2/2003 | Nur |
| 6,579,572 B2 | 6/2003 | Espin et al. |
| 6,652,682 B1 | 11/2003 | Fawls |
| 6,729,409 B1 | 5/2004 | Gupta et al. |
| 6,749,022 B1 | 6/2004 | Fredd |
| 6,776,235 B1 | 8/2004 | England |
| 6,832,158 B2 | 12/2004 | Mese |
| 6,846,420 B2 | 1/2005 | Reddy et al. |
| 6,866,048 B2 | 3/2005 | Mattox |
| 6,884,760 B1 | 4/2005 | Brand et al. |
| 6,947,843 B2 | 9/2005 | Fisher et al. |
| 6,989,391 B2 | 1/2006 | Funkhouser |
| 7,086,484 B2 | 8/2006 | Smith |
| 7,098,663 B1 | 8/2006 | Bader |
| 7,210,528 B1 | 5/2007 | Brannon et al. |
| 7,255,169 B2 | 8/2007 | van Batenburg et al. |
| 7,261,158 B2 | 8/2007 | Middaugh et al. |
| 7,281,580 B2 | 10/2007 | Parker et al. |
| 7,281,581 B2 | 10/2007 | Nyuyen et al. |
| 7,326,670 B2 | 2/2008 | DiLullo et al. |
| 7,334,635 B2 | 2/2008 | Nguyen |
| 7,334,636 B2 | 2/2008 | Nguyen |
| 7,344,889 B2 | 3/2008 | Kelemen et al. |
| 7,369,980 B2 | 5/2008 | Deffenbaugh et al. |
| 7,424,911 B2 | 9/2008 | McCarthy et al. |
| 7,451,812 B2 | 11/2008 | Cooper et al. |
| 7,472,751 B2 | 1/2009 | Brannon et al. |
| 7,500,517 B2 | 3/2009 | Looney et al. |
| 7,526,418 B2 | 4/2009 | Pita et al. |
| 7,527,097 B2 | 5/2009 | Patel |
| 7,565,831 B2 | 7/2009 | Miyahara |
| 7,571,767 B2 | 8/2009 | Parker et al. |
| 7,581,590 B2 | 9/2009 | Lesko et al. |
| 7,588,085 B2 | 9/2009 | Acock et al. |
| 7,621,173 B2 | 11/2009 | Hsu |
| 7,645,883 B1 | 1/2010 | Hawkins et al. |
| 7,654,159 B2 | 2/2010 | Enoksson |
| 7,703,531 B2 | 4/2010 | Huang |
| 7,771,549 B1 | 8/2010 | Christe et al. |
| 7,789,164 B2 | 9/2010 | Looney et al. |
| 7,803,740 B2 | 9/2010 | Bicerano et al. |
| 7,857,055 B2 | 12/2010 | Li |
| 7,918,277 B2 | 4/2011 | Brannon et al. |
| 7,921,911 B2 | 4/2011 | Fuller et al. |
| 7,983,845 B2 | 7/2011 | Minh |
| 8,003,212 B2 | 8/2011 | Smith et al. |
| 8,003,577 B2 | 8/2011 | Li et al. |
| 8,006,760 B2 | 8/2011 | Fleming et al. |
| 8,066,068 B2 | 11/2011 | Lesko et al. |
| 8,104,536 B2 | 1/2012 | Looney et al. |
| 8,119,576 B2 | 2/2012 | Reyes et al. |
| 8,127,850 B2 | 3/2012 | Brannon et al. |
| 8,165,817 B2 | 4/2012 | Betancourt et al. |
| 8,177,422 B2 | 5/2012 | Kjoller et al. |
| 8,205,675 B2 | 6/2012 | Brannon et al. |
| 8,225,866 B2 | 7/2012 | Rouffignac et al. |
| 8,278,931 B2 | 10/2012 | Fang et al. |
| 8,352,228 B2 | 1/2013 | Walters et al. |
| 8,380,437 B2 | 2/2013 | Abousleiman et al. |
| 8,408,305 B2 | 4/2013 | Brannon et al. |
| 8,473,213 B2 | 6/2013 | Zhu et al. |
| 8,490,700 B2 | 7/2013 | Lesko et al. |
| 8,636,065 B2 | 1/2014 | Lesko et al. |
| 8,701,788 B2 | 4/2014 | Wigand et al. |
| 8,729,903 B2 | 5/2014 | Srnka et al. |
| 8,757,259 B2 | 6/2014 | Lesko et al. |
| 8,763,699 B2 | 7/2014 | Medvedev et al. |
| 8,763,703 B2 | 7/2014 | Saini et al. |
| 8,796,187 B2 | 8/2014 | Reyes et al. |
| 8,822,386 B2 | 9/2014 | Quintero et al. |
| 8,835,363 B2 | 9/2014 | Amanullah et al. |
| 8,839,860 B2 | 9/2014 | Wigand et al. |
| 8,844,366 B2 | 9/2014 | Warren |
| 8,851,177 B2 | 10/2014 | Wigand |
| 8,865,482 B2 | 10/2014 | Wang et al. |
| 8,868,385 B2 | 10/2014 | Fertig et al. |
| 8,936,083 B2 | 1/2015 | Nguyen |
| 8,936,089 B2 | 1/2015 | Wigand |
| 9,006,151 B2 | 4/2015 | Amanullah et al. |
| 9,006,153 B2 | 4/2015 | Lin et al. |
| 9,033,043 B2 | 5/2015 | Hinkel |
| 9,057,797 B2 | 6/2015 | Omeragic et al. |
| 9,080,440 B2 | 7/2015 | Panga et al. |
| 9,085,727 B2 | 7/2015 | Litvinets et al. |
| 9,128,210 B2 | 9/2015 | Pomerantz |
| 9,133,398 B2 | 9/2015 | Wigand et al. |
| 9,152,745 B2 | 10/2015 | Glinsky |
| 9,297,244 B2 | 3/2016 | Mahoney et al. |
| 9,523,268 B2 | 12/2016 | Potapenko et al. |
| 9,664,018 B2 | 5/2017 | Vandeponseele et al. |
| 9,670,764 B2 | 6/2017 | Lesko et al. |
| 9,688,904 B2 | 6/2017 | Wang et al. |
| 9,696,270 B1 | 7/2017 | Roy et al. |
| 9,725,645 B2 | 8/2017 | Monastiriotis et al. |
| 9,753,016 B1 | 9/2017 | Daugela |
| 9,784,882 B2 | 10/2017 | Vinegar et al. |
| 9,816,365 B2 | 11/2017 | Nguyen et al. |
| 9,834,721 B2 | 12/2017 | Chang et al. |
| 9,863,211 B2 | 1/2018 | Gamage et al. |
| 9,863,230 B2 | 1/2018 | Litvinets et al. |
| 9,863,231 B2 | 1/2018 | Hull et al. |
| 9,869,649 B2 | 1/2018 | Hull et al. |
| 9,885,691 B1 | 2/2018 | Daugela |
| 9,895,670 B2 | 2/2018 | Anders et al. |
| 9,902,898 B2 | 2/2018 | Nelson et al. |
| 9,909,404 B2 | 3/2018 | Hwang et al. |
| 9,927,344 B2 | 3/2018 | Chertov |
| 9,995,125 B2 | 6/2018 | Madasu et al. |
| 9,995,220 B2 | 6/2018 | Hawie et al. |

(56) References Cited

U.S. PATENT DOCUMENTS

| | | | |
|---|---|---|---|
| 10,001,769 B2 | 6/2018 | Huang et al. | |
| 10,030,495 B2 | 7/2018 | Litvinets et al. | |
| 10,047,281 B2 | 8/2018 | Nguyen et al. | |
| 10,066,149 B2 | 9/2018 | Li et al. | |
| 10,077,396 B2 | 9/2018 | Nguyen et al. | |
| 10,113,396 B2 | 10/2018 | Nelson et al. | |
| 10,151,715 B2 | 12/2018 | Hull et al. | |
| 10,273,398 B2 | 4/2019 | Liu et al. | |
| 10,329,478 B2 | 6/2019 | Schnoor et al. | |
| 10,351,758 B2 | 7/2019 | Hull et al. | |
| 10,379,068 B2 | 8/2019 | Hull et al. | |
| 2003/0209248 A1 | 11/2003 | Ward | |
| 2003/0212465 A1 | 11/2003 | Howard et al. | |
| 2003/0221831 A1* | 12/2003 | Reddy | C09K 8/703 507/275 |
| 2004/0211567 A1 | 10/2004 | Aud | |
| 2005/0060130 A1 | 3/2005 | Shapiro et al. | |
| 2005/0103118 A1 | 5/2005 | Workman | |
| 2005/0274523 A1 | 12/2005 | Brannon et al. | |
| 2006/0025321 A1* | 2/2006 | Treybig | C09K 8/68 510/382 |
| 2006/0047489 A1 | 3/2006 | Scheldt et al. | |
| 2006/0092766 A1 | 5/2006 | Shelley et al. | |
| 2006/0265204 A1 | 11/2006 | Wallis et al. | |
| 2007/0054054 A1 | 3/2007 | Svoboda et al. | |
| 2007/0087940 A1 | 4/2007 | Qu et al. | |
| 2007/0203677 A1 | 8/2007 | Awwiller | |
| 2007/0298979 A1 | 12/2007 | Perry et al. | |
| 2008/0059140 A1 | 3/2008 | Salmon et al. | |
| 2008/0070806 A1 | 3/2008 | Lin et al. | |
| 2008/0081771 A1 | 4/2008 | Lin et al. | |
| 2008/0093073 A1 | 4/2008 | Bustos et al. | |
| 2008/0234147 A1 | 9/2008 | Li et al. | |
| 2009/0071239 A1 | 3/2009 | Rojas et al. | |
| 2009/0087912 A1 | 4/2009 | Ramos et al. | |
| 2009/0143252 A1 | 6/2009 | Lehmann | |
| 2009/0193881 A1 | 8/2009 | Finnberg | |
| 2009/0242196 A1 | 10/2009 | Pao | |
| 2009/0248309 A1 | 10/2009 | Nelville et al. | |
| 2009/0253595 A1 | 10/2009 | Qu | |
| 2009/0283257 A1 | 11/2009 | Becker | |
| 2009/0313772 A1 | 12/2009 | Talley | |
| 2010/0010106 A1 | 1/2010 | Crews | |
| 2010/0049625 A1 | 2/2010 | Biebesheimer et al. | |
| 2010/0051511 A1 | 3/2010 | Faerman | |
| 2010/0121623 A1 | 5/2010 | Yogeswaren | |
| 2010/0128982 A1 | 5/2010 | Dvorkin et al. | |
| 2010/0186520 A1 | 7/2010 | Wheeler | |
| 2010/0213579 A1 | 8/2010 | Henry | |
| 2010/0224365 A1 | 9/2010 | Abad | |
| 2010/0243242 A1 | 9/2010 | Boney et al. | |
| 2010/0258265 A1 | 10/2010 | Karanikas et al. | |
| 2010/0263867 A1 | 10/2010 | Horton et al. | |
| 2010/0276142 A1 | 11/2010 | Skildum et al. | |
| 2010/0279136 A1 | 11/2010 | Bonucci | |
| 2010/0314113 A1 | 12/2010 | Huang | |
| 2011/0065612 A1 | 3/2011 | Stokes et al. | |
| 2011/0092395 A1* | 4/2011 | Peng | C11D 3/28 546/346 |
| 2011/0257944 A1 | 10/2011 | Du et al. | |
| 2011/0259588 A1 | 10/2011 | Ali | |
| 2012/0018159 A1 | 1/2012 | Gulta et al. | |
| 2012/0026037 A1 | 2/2012 | Thomson et al. | |
| 2012/0129737 A1 | 5/2012 | Lesko et al. | |
| 2012/0179444 A1 | 7/2012 | Ganguly et al. | |
| 2012/0193578 A1 | 8/2012 | Pan et al. | |
| 2012/0247774 A1 | 10/2012 | Li et al. | |
| 2012/0261129 A1 | 10/2012 | Becker | |
| 2012/0261617 A1 | 10/2012 | Pan et al. | |
| 2012/0267102 A1 | 10/2012 | Huang et al. | |
| 2012/0318498 A1 | 12/2012 | Parsche | |
| 2013/0013209 A1 | 1/2013 | Zhu et al. | |
| 2013/0056213 A1 | 3/2013 | Medvedev et al. | |
| 2013/0084643 A1 | 4/2013 | Commarieu et al. | |
| 2013/0137610 A1 | 5/2013 | Huang | |
| 2013/0160994 A1 | 6/2013 | Alsop et al. | |
| 2013/0161002 A1 | 6/2013 | Wigand | |
| 2013/0213120 A1 | 8/2013 | Lebedev | |
| 2013/0213638 A1 | 8/2013 | Keller | |
| 2013/0228019 A1 | 9/2013 | Meadows | |
| 2013/0231908 A1 | 9/2013 | Williams et al. | |
| 2013/0233536 A1 | 9/2013 | Alqam | |
| 2013/0238304 A1 | 9/2013 | Glinsky | |
| 2013/0269933 A1 | 10/2013 | Pomerantz et al. | |
| 2013/0275099 A1 | 10/2013 | Frydman | |
| 2014/0008305 A1 | 1/2014 | Nichols et al. | |
| 2014/0027109 A1 | 1/2014 | Al-Baraik | |
| 2014/0045732 A1 | 2/2014 | Mazyar | |
| 2014/0048694 A1 | 2/2014 | Pomerantz | |
| 2014/0090850 A1 | 4/2014 | Benicewicz | |
| 2014/0096964 A1 | 4/2014 | Chakraborty et al. | |
| 2014/0116710 A1 | 5/2014 | Naser-El-Din et al. | |
| 2014/0221257 A1 | 8/2014 | Roddy | |
| 2014/0231077 A1 | 8/2014 | Rivero et al. | |
| 2014/0243246 A1 | 8/2014 | Hendrickson | |
| 2014/0247997 A1 | 9/2014 | Nishyama | |
| 2014/0251605 A1 | 9/2014 | Hera | |
| 2014/0260694 A1 | 9/2014 | Szlendak | |
| 2014/0364343 A1 | 12/2014 | Nelson et al. | |
| 2014/0367100 A1 | 12/2014 | Oliveria et al. | |
| 2014/0374104 A1 | 12/2014 | Kushal | |
| 2015/0019183 A1 | 1/2015 | Suzuki | |
| 2015/0055438 A1 | 2/2015 | Yan et al. | |
| 2015/0057097 A1 | 2/2015 | Cho | |
| 2015/0057196 A1 | 2/2015 | Debord | |
| 2015/0065398 A1 | 3/2015 | Gartland et al. | |
| 2015/0075782 A1 | 3/2015 | Sharma | |
| 2015/0152724 A1 | 6/2015 | Amendt | |
| 2015/0167440 A1 | 6/2015 | Kasevich | |
| 2015/0192005 A1 | 7/2015 | Saeedfar | |
| 2015/0259593 A1 | 9/2015 | Kaufman et al. | |
| 2015/0284625 A1 | 10/2015 | Silveira | |
| 2015/0293256 A1 | 10/2015 | Dusterhoft | |
| 2015/0322759 A1 | 11/2015 | Okoniewski | |
| 2016/0103047 A1 | 4/2016 | Liu | |
| 2016/0103049 A1 | 4/2016 | Liu | |
| 2016/0130496 A1 | 5/2016 | Holtsclaw et al. | |
| 2016/0137904 A1 | 5/2016 | Drake | |
| 2016/0194551 A1 | 7/2016 | Waters et al. | |
| 2016/0215202 A1 | 7/2016 | Weaver et al. | |
| 2016/0215205 A1 | 7/2016 | Nguyen | |
| 2016/0256583 A1 | 9/2016 | Yamada | |
| 2016/0265331 A1 | 9/2016 | Weng et al. | |
| 2016/0362965 A1 | 12/2016 | Parlar et al. | |
| 2017/0015895 A1 | 1/2017 | Cox | |
| 2017/0066959 A1* | 3/2017 | Hull | C09K 8/805 |
| 2017/0066962 A1 | 3/2017 | Ravi et al. | |
| 2017/0067836 A1 | 3/2017 | Hull et al. | |
| 2017/0137703 A1 | 5/2017 | Leverson et al. | |
| 2017/0145303 A1 | 5/2017 | Fontenelle et al. | |
| 2017/0198207 A1 | 7/2017 | Li et al. | |
| 2017/0275525 A1 | 9/2017 | Koep et al. | |
| 2017/0336528 A1 | 11/2017 | Badri et al. | |
| 2017/0370197 A1 | 12/2017 | Han et al. | |
| 2018/0112126 A1 | 4/2018 | Yang et al. | |
| 2018/0155602 A1 | 6/2018 | Zhang | |
| 2018/0195982 A1 | 7/2018 | Hull et al. | |
| 2019/0211658 A1 | 7/2019 | Hull et al. | |

FOREIGN PATENT DOCUMENTS

| | | |
|---|---|---|
| CN | 1621803 | 5/2012 |
| CN | 103387827 | 11/2013 |
| CN | 102183410 | 5/2014 |
| CN | 104727799 | 6/2015 |
| CN | 105445440 | 3/2016 |
| EP | 247669 | 12/1987 |
| EP | 2480625 | 4/2013 |
| EP | 2480626 | 4/2013 |
| WO | 1997028098 | 8/1997 |
| WO | 2000060379 | 10/2000 |
| WO | 2001094749 | 12/2001 |
| WO | 2002064702 | 8/2002 |
| WO | 2004005435 | 1/2004 |

(56) References Cited

FOREIGN PATENT DOCUMENTS

| | | |
|---|---|---|
| WO | 2008001218 | 1/2008 |
| WO | 2010138914 | 12/2010 |
| WO | 2011035292 | 3/2011 |
| WO | 2011035294 | 3/2011 |
| WO | 2012051647 | 4/2012 |
| WO | 2012057910 | 5/2012 |
| WO | 2012087887 | 6/2012 |
| WO | 2012087898 | 6/2012 |
| WO | 2012104582 | 8/2012 |
| WO | 2012122505 | 9/2012 |
| WO | 2012171857 | 12/2012 |
| WO | 2013052359 | 4/2013 |
| WO | 2013112114 | 8/2013 |
| WO | 2013149122 | 10/2013 |
| WO | 2013155061 | 10/2013 |
| WO | 2014008598 | 1/2014 |
| WO | 2014123672 | 8/2014 |
| WO | 2015041664 | 3/2015 |
| WO | 2015071750 | 5/2015 |
| WO | 2015097116 | 7/2015 |
| WO | 2015126082 | 8/2015 |
| WO | 2015163858 | 10/2015 |
| WO | 2015181028 | 12/2015 |
| WO | 2015200060 | 12/2015 |
| WO | 2016094153 | 6/2016 |
| WO | 2017035371 | 3/2017 |
| WO | 2017040824 | 3/2017 |
| WO | 2017040834 | 3/2017 |
| WO | 2017086975 | 5/2017 |
| WO | 2017136641 | 8/2017 |
| WO | 2018025010 | 2/2018 |

OTHER PUBLICATIONS

PCT International Search Report and Written Opinion in International Appln. No. PCT/US2020/066406, dated Apr. 29, 2021, 14 pages.

Abad et al., "Evaluation of the Material Properties of the Multilayered Oxides formed on HCM12A using New and Novel Techniques," Manuscript Draft, Manuscript No. OXID-D-15-00019, published in 2015, 44 pages.

Abass et al., "Wellbore Instability of Shale Formation, Zuluf Field, Saudi Arabia," presented at the SPE Technical Symposium on Saudi Arabia Section, Dhahran, Saudi Arabia, May 21-23, 2006, 10 pages.

Abousleiman and Nguyen, "Poromechanics Response of Inclined Wellbore Geometry in Fractured Porous Media," Journal of Engineering Mechanics, vol. 131, No. 11, Nov. 2005, 14 pages.

Abousleiman et al, "A Micromechanically Consistent Poroviscoelasticity Theory for Rock Mechanics Applications," Int. J. Rock Mech. Min. Sci. & Geomech. Abstr., vol. 30, No. 7, published in 1993, 4 pages.

Abousleiman et al, "Anisotropic Porothermoelastic Solution and Hydro-Thermal Effects on Fracture Width in Hydraulic Fracturing," Int. J. Numer. Anal. Meth. Geomech., published in 2013, 25 pages.

Abousleiman et al, "Poroviscoelastic Analysis of Borehole and Cylinder Problems," ACTA Mechanica, vol. 119, published in 1996, 21 pages.

Abousleiman et al, "The Granular and Polymer Nature of Kerogen Rich Shale," Acta Geotechnica 2016, 11 (3), pp. 573-594, 22 pages.

Abousleiman et al., "GeoGenome Industry Consortium (G2IC)," JIP, 2004-2006, 6 pages.

Abousleiman et al., "Geomechanics field characterization of Woodford Shale and Barnett Shale with advanced logging tools and nano-indentation on drill cuttings," The Leading Edge, Jun. 2010, 6 pages.

Abousleiman et al., "Mandel's Problem Revisited," Geotechnique, 46, No. 2, published in 1996, 9 pages.

Abousleiman et al., "Mechanical Characterization of Small Shale Samples subjected to Fluid Exposure using the Inclined Direct Shear Testing Device," Int. J. Rock Mech. & Min. Sci., vol. 47, No. 3, published in 2010, 13 pages.

Abousleiman et al., "Modeling Real-Time Wellbore Stability within the Theory of Poromechanics," AADE-03-NTCE-11, presented at the AADE 2003 National Technology Conference, Practical Soultions for Drilling Challenges, Texas, Apr. 1-3, 2003, 14 pages.

Abousleiman et al., "Poroelastic Solutions in Transversely Isotropic Media for Wellbore and Cylinder," Int. J. Solids Structures, vol. 35, Nos. 34-35, published in 1998, 25 pages.

Abousleiman et al., "SPE 110120: Geomechanics Field and Laboratory Characterization of Woodford Shale: The Next Gas Play," SPE International, presented at the 2007 SPE Annual Technical Conference and Exhibition, Nov. 11-14, 2007, 14 pages.

Abousleiman et al., "SPE 124428: GeoMechanics Field Characterization of the Two Prolific U.S. Mid-West Gas Plays with Advanced Wire-Line Logging Tools," SPE International, presented at the 2009 SPE Annual Technical Conference and Exhibition, Oct. 4-7, 2009, 19 pages.

Abousleiman et al., "Time-Dependent wellbore (in)stability predictions: theory and case study," IADC/SPE 62796, presented at the 2000 IADC/SPE Asia Pacific Drilling Technology held in Kuala Lumur, Malaysia, Sep. 11-13, 2000, 8 pages.

Agenet et al., "SPE 157019: Fluorescent Nanobeads: a First Step Toward Intelligent Water Tracers," Society of Petroleum Engineers, SPE International Oilfield Nanotechnology conference, Jun. 12-14, 2012, 13 pages.

Aglient "Field-Deployable Solution for Nanoporosity Measurements in Mud Logging Operations and a Novel Method for Fracability Analysis Using Mud Cuttings," Agilent Technologies, Oct. 2013, 44 pages.

Ahmed et al. "7.2.2 Information Required to Move to a Pilot Project," Unconventional Resources Exploitation and Development, 2016, 1 page.

Allan et al., "A Multiscale Methodology for the Analysis of Velocity Anisotropy in Organic-Rich Shale," Geophysics, vol. 80, No. 4, Jul.-Aug. 2015, 16 pages.

Al-Munthasheri, "A Critical Review of Hydraulic Fracturing Fluids over the Last Decade," SPE 169552, presented at the SPE Western North American and Rocky Mountain Joint Regional Meeting, Apr. 16-18, 2014, 25 pages.

Altowairqi, "Shale elastic property relationships as a function of total organic carbon content using synthetic samples," Journal of Petroleum Science and Engineering vol. 133, Sep. 2015, 9 pages.

Ananthan et al., "Influence of Strain Softening on the Fracture of Plain Concrete Beams," Int. J. of Fracture, vol. 45, published in 1990, 25 pages.

Anisimov, "SPE 118862: The Use of Tracers for Reservoir Characterization," Society of petroleum Engineers (SPE), presented at SPE Middle East Oil and Gas Show and Conference, Mar. 15-18, 2009, 8 pages.

Arns et al: "Computation of linear elastic properties from microtomographic images: Methodology and agreement between theory and experiment", GEOPHYSICS, vol. 67, No. 5, Sep. 1, 2002, pp. 1396-1405, 10 pages.

Aslan et al., "Fluorescent Core—Shell AG@$SiO_2$ Nanocomposites for Metal-Enhanced Fluorescence and Single Nanoparticle Sensing Platforms," Jan. 19, 2007, 2 pages.

Ballice, "Solvent Swelling Studies of Goynuk (Kerogen Type-I) and Beypazari Oil Shales (Kerogen Type-II)," Science Direct, Fuel vol. 82, published in 2003, 5 pages.

Barati and Liang, "A Review of Fracturing Fluid Systems Used for Hydraulic Fracturing of Oil and Gas Wells," Journal of Applied Polymer Science, vol. 131, Issue 16, Aug. 15, 2014, 11 pages.

Barenblatt et al., "Basic Concepts in the Theory of Seepage of Homogeneous Liquids in Fissured Rocks (Strata)," PMM vol. 24, No. 5, 1960, 18 pages.

Bazant et al., "Deformation of Progressively Cracking Reinforced Concrete Beams," ACI Journal, Technical Paper, Title No. 81-26, vol. 81, No. 3, May-Jun. 1984, 11 pages.

Bazant et al., "Size Effect in Brazilian Split-Cylinder Tests: Mesurements and Fracture Analysis," ACI Materials Journal, vol. 88, No. 3, May 31, 1991; pp. 325-332.

Bennett et al., "Instrumented Nanoindentation and 3D Mechanistic Modeling of a Shale at Multiple Scales," Acta Geotechnica, vol. 10, No. 21, Jan. 9, 2015; 14 pages.

(56) References Cited

OTHER PUBLICATIONS

Berryman, "Extension of Poroelastic Analysis to Double-Porosity Materials: New Technique in Microgeomechanics," Journal of Eng Mech., vol. 128, No. 8, 2002, 8 pages.

Bhandari et al., "Two-Dimensional DEM Analysis of Behavior of Geogrid-Reinforced Uniform Granular Bases under a Vertical Cyclic Load, Acta Geotechnica," published in 2014, 12 pages.

Biot et al., "Temperature analysis in hydraulic fracturing," Journal of Petroleum Technology, vol. 39, No. 11, Nov. 1987, 9 pages.

Biot, "General Theory of Three-Dimensional Consolidation," Journal of Applied Physics, vol. 12, No. 2, Feb. 1941, 11 pages.

Bisnovat et al., "Mechanical and petrophysical behavior of organic-rich chalk from the Judea Plains, Israel," Marine and Petroleum Geology, vol. 64, Jun. 2015, 13 pages.

Bobko et al., "The Nanogranular Origin of Friction and Cohesion in Shale—A Strength Homogenization Approach to Interpretation of Nanoindentation Results," Int. J. Numer. Anal. Meth. Geomech., published in 2010, 23 pages.

Boskey et al., "Perspective—Collagen and Bone Strength," Journal of Bone and Mineral Research, vol. 14, No. 3, published in 1999, 6 pages.

Bratton et al., "The Nature of Naturally Fractured Reservoirs," June Oilfield Review, 2006, 21 pages.

Brochard et al., "Fracture Properties of Kerogen and Importance for Organic-Rich Shales," Annual World Conference on Carbon (Carbon 2013), Jul. 2013, 5 pages.

Bunzli et al., "Taking advantage of luminescent lanthanide ions," Chemical Society Reviews, Dec. 2005, 29 pages.

Caenn et al., "Chapter 9: Wellbore Stability," p. 359, in Composition and Properties of Drilling and Completion Fluids, 7th Edition: Gulf Professional Publishing, 2016, 1 page.

Cahill et al., "Nanoscale Thermal Transport II," Applied Physics Reviews 1.1, 2014, 46 pages.

Cahill et al., "Nanoscale thermal transport," Journal of applied physics vol. 93, No. 2, Jan. 2003, 28 pages.

California Council on Science and Technology Lawrence Berkeley National Laboratory Pacific Institute, "Advanced Well Stimulation Technologies in California: An Independent Review of Scientific and Technical Information," CCST, Jul. 2016, 400 pages.

Carcione and Avseth, "Rock-physics templates for clay-rich source rocks," Geophysics vol. 80, Issue 5, D481-D500, Sep. 2015, 21 pages.

Carter and Hanson, "Fake Moon Dirt, HOOD Solar System Science," UT Dallas Magazine, vol. 6, Issue 2, Spring 2016, 1 page.

Chang et al., "Magnetic SERS Composite Nanoparticles for Microfluidic Detection," 251st ACE National Meeting, Mar. 13-17, 2016, 1 pages.

Chang, "In-Situ Formation of Proppant and Highly Permeable Blocks for Hydraulic Fracturing," SPE Hydraulic Fracturing Technology Conference 2015.

Chen et al., "Size Effect in Micro-Scale Cantilever Beam Bending, "Acta Mech., published in 2011, 17 pages.

Chen et al., "FITC functionalized magnetic core-shell $Fe_3O_4$/Ag hybrid nanoparticle for selective determination of molecular biothiols," Elsevier Ltd., Dec. 2013, 7 pages.

Chern et al., "Deformation of Progressively Cracking Partially Prestressed Concrete Beams," PCI Journal, vol. 37, No. 1, published in 1992, 11 pages.

Cheshomi et al., "Determination of uniaxial compressive strength of microcystalline limestone using single particles load test," Journal of Petroleum Science and Engineering, vol. 111, 2013, 6 pages.

Chuang et al., "Ultra-sensitive in-situ detection of novel near-infrared persistent luminescent tracer nanoagents in crude oil-water mixtures," a natureresearch journal, Scientific Reports, Jun. 15, 2016, 5 pages.

Chupin et al., "Finite Strain Analysis of Nonuniform Deformation Inside Shear Bands in Sands," Int. J. Numer. Anal. Meth. Geomech., published in 2012, 16 pages.

Corapcioglu, "Fracturing Fluid Effects on Young's Modulus and Embedment in the Niobrara Formation," Thesis for degree of Master of Science (Petroleum Engineering), Colorado School of Mines, 2014, 189 pages.

Cubillos et al., "SPE 174394-MS: The Value of Inter-well and Single Well Tracer Technology for De-Risking and Optimizing a CEOR Process—Caracara Field Case," Society of Petroleum Engineers (SPE), presented at EUROPEC 2015, Jun. 1-4, 2015, 19 pages.

Cui et al., "Poroelastic solution for an inclined borehole," Journal of Applied Mechanics, vol. 64, Mar. 1997, 7 pages.

Custelcean et al., "Aqueous Sulfate Separation by Crystallization of Sulfate-Water Clusters," Angew. Chem. Int. Ed., published in 2015, vol. 54, pp. 10525-10529.

Dagan, "Models of Groundwater Flow in Statistically Homogeneous Porous Formations," Water Resource Res. vol. 15, Feb. 1979, 17 pages.

Daneshy, "Hydraulic Fracturing to Improve Production," Tech 101, TheWayAhead, vol. 6, No. 3, Oct. 2010, 4 pages.

Das et al., "Molecular Fluorescence, Phosphorescence, and Chemiluminescence Spectrometry," Analytical Chemistry, Nov. 3, 2011, 29 pages.

De Block et al., "SPE-177601-MS: A New Solution for the Characterization of Unconventional Shale Resources Based on Analysis or Drill Cutting," SPE International, presented at the Abu Dhabi International Petroleum Exhibition and Conference, Nov. 9-12, 2015, 6 pages.

De Rocha et al, "Concentrated CO2-in-Water Emulsions with Nonionic Polymeric Surfactants," J. Colloid Interface Sci. 2001 239 (1), pp. 241-253, 13 pages.

Deans, "SPE 7076: Using Chemical Tracers To Measure Fractional Flow And Saturation In-Situ," Society of Petroleum Engineers (SPE), presented at SPE Symposium on improved Methods of Oil Recovery, Apr. 16-17, 1978, 10 pages.

Deirieh et al., "Nanochemomechanical Assessment of Shale: A Coupled WDS-Indentation Analysis," Acta Geotechnica, published in 2012, 25 pages.

Delafargue and Ulm, "Explicit approximations of the indentation modulus of elastically orthotropic solids for conical indenters," International Journal of Solids and Structures vol. 41, Issue 26, Dec. 2004, 10 pages.

Detournay and Cheng, "Poroelastic Response of a Borehole in a Non-Hydrostatic Stress Field," International Journal of Rock Mechanics, Min. Science and Geomech. Abstracts, vol. 25, No. 3, 1988, 12 pages.

Devarapalli et al., "Micro-CT and FIB-SEM imaging and pour structure characterization of dolomite rock at multiple scales," Arabian Journal of Geosciences, Aug. 2017, 9 pages.

Du et al., "SPE 93140: Interwell Tracer Tests: Lessons Learnted from past Field Studies," Society of Petroleum Engineers (SPE), presented at SPE Asia Pacific Oil and Gas Conference and Exhibition, Apr. 5-7, 2005, 9 pages.

Eastoe et al, "Water-in-CO2 Microemulsions Studied by Small-Angle Neutron Scattering," Langmuir 1997, 13(26), pp. 6980-6984, 5 pages.

Ehlig-Economides and Economides, "Water as Poppant," SPE-147603, presented at the SPE Annual Technical Conference and Exhibition, Oct. 30-Nov. 2, 2011, 8 pages.

Ekbote et al., "Porochemoelastic Solution for an Inclided Borehole in a Transversely Isotropic Formation," J. of Eng. Mech., ASCE, Jul. 2006, 10 pages.

El-Aneed et al., "Mass Spectrometry, Review of the Basics: Electrospray, MALDI, and Commonly Used Mass Analyzers," Applied Spectroscopy Reviews, Mar. 16, 2009, 22 pages.

Elijah, "Numerical Modeling of Wellbore Instability (Tensile Failure) Using Fracture Mechanics Approach," Thesis for the degree of Master of Science, African University of Science and Technology Abuja, May 2013, 77 pages.

Eliyahu et al, "Mechanical Properties of organic matter in shales mapped at the nanometer scale", Marine and Petroleum Geology, vol. 59, pp. 294-304, Sep. 18, 2014, 11 pages.

(56) References Cited

OTHER PUBLICATIONS

Ertas et al., "Petroleum Expulsion Part 1. Theory of Kerogen Swelling in Multicomponent Solvents," Energy & Fuels, published in 2006, 6 pages.

Eseme et al., "Review of mechanical properties of oil shales: implications for exploitation and basin modeling," Oil Shale, vol. 24, No. 2, Jan. 2007, 16 pages.

Esfahani et al., "Quantitative nanoscale mapping of three-phase thermal conductivities in filled skutterudites via scanning thermal microscopy," Nature Science Review, vol. 5, Issue 1, Feb. 2017, 31 pages.

Ewy, "Shale Swelling/Shrinkage and Water Content Change due to Imposed Suction and Due to Direct Brine Contact," Acta Geotechnica, published in 2014, 18 pages.

Ewy, "Wellbore-Stability Predictions by Use of a Modefied Lade Criterion," SPE Drill and Completion, vol. 14, No. 2, Jun. 1999, 7 pages.

Fjaer et al., "Petroleum Related Rock Mechanics," 2nd Edition, Elsevier Science, 2008, p. 156, 1 page.

Frazer et al., "Localized Mechanical Property Assessment of SiC/SiC Composite Materials," Science Direct, Part A 70, published in 2015, 9 pages.

Gallegos and Varela, "Trends in Hydraulic Fracturing Distributions and Treatment Fluids, Additives, Proppants, Water Volumes Applied to Wells Drilled in the United States from 1947 through 2010—Data Analysis and Comparison to the Literature," USGS, United States Geological Survey, 2015, 24 pages.

Gandossi and Estorff, "An overview of hydraulic fracturing and other formation stimulation technologies for shale gas production," JRC Science for Policy Report, European Commission, EUR 26347 EN, Jan. 2013, 62 pages.

Ganjdanesh et al. "Treatment of Condensate and Water Blocks in Hydraulic-Fractured Shale-Gas/Condensate Reservoirs," SPE-175145, presented at the SPE Annual Technical Conference and Exhibition, Sep. 28-30, 2015, published in SPE Journal, Apr. 2016, 10 pages.

Gao et al., "Materials Become Insensitive to Flaws at Nanoscale: Lessons from Nature," PNAS, vol. 100, No. 10, May 13, 2003, 628 pages.

Gardiner et al., "Practical Raman Spectroscopy," Springer-Verlag, 1989, 9 pages.

Garnero, "The Contribution of Collagen Crosslinks to Bone Strength," Int. Bone & Mineral Society, Sep. 2012, 8 pages.

George et al.; Approximate relationship between frequency-dependent skin depth resolved from geoelectronnagnetic pedotransfer function and depth of investigation resolved from geoelectrical measurements: A case study of coastal formation, southern Nigeria; Oct. 2016; J. Earth Syst. Sci.; 1379-1390 (Year: 2016).

Georgi et al., "Physics and Chemistry in Nanoscale Rocks", Mar. 22-26, 2015, La Jolla, California, USA, SPE Forum Series; 4 pages.

Glossary.oilfield.sib.com' [online], "Oilfield Glossary: fluid-friction reducer," available on or before Jun. 15, 2017, retrieved from URL< http://www.glossary.oilfield.slb.com/Terms/f/fluid-friction_reducer.aspx>, 1 page.

Glover et al., "ARMA 16-0737: The Use of Measurements Made on Drill Cuttings to Construct and Apply Geomechanical Well Profiles," ARMA, presentation at the 50th US Rock Mechanics/Geomechanics Symposium, Jun. 26-29, 2016, 11 pages.

Golomb et al, "Macroemulsion of liquid and supercritical CO2-in-water and water-in-liquid CO2 stabilized with fine particles," Ind. Eng. Chem. Res. 2006, 45(8), pp. 2728-2733, 6 pages.

Goodman, "Introduction to Rock Mechanics," John Wiley & Sons, Chapter 3: Rock Strength and Failure Criteria; 1989, 21 pages.

Gu and Mohanty, "Effect of Foam Quality on Effectiveness of Hydraulic Fracturing in Shales," International Journal of Roch Mechanics and Mining Sciences, vol. 70, 2014, 13 pages.

Han and Cundall, "LBM-DEM modeling of fluid-solid internation in porous media," International Journal for Numerical and Analytical Methods in Geomechanics, vol. 37, No. 10, Jul. 2013, 17 pages.

Han et al., "Numerical and Experimental Studies of Kerogen Rich Shales on Millimeter-Scale Single-Edge Notched Beam," prepared for presentation at the 53rd US Rock Mechanics and Geomechanics Symposium in New York, Jun. 23-26, 2019, 8 pages.

Han et al., "Numerical Modeling of Elastic Hemispherical Contact for Mohr-Coulomb Type Failures in Micro-Geomaterials," Experimental Mechanics, vol. 57, Jun. 16, 2017, 15 pages.

Han et al., "Application of Silver-Coated Magnetic Microspheres to a SERS-Based Optofluidic Sensor," The Journal of Physical Chemistry (JPCC), Mar. 7, 2011, 7 pages.

Harrison et al, "Water-in-Carbon Dioxide Microemulsions with a Fluorocarbon-Hydrocarbon Hybrid Surfactant," Langmuir 1994, 10(10), pp. 3536-3541. 6 pages.

Hiramatsu and Oka, "Stress around a shaft or level excavated in ground with a three-dimensional stress state," Mem. Fra. Eng. Kyotu Univ. vol. 24, 1962, 2 pages ABSTRACT.

Hoang et al., "Correspondence Principle Between Anisotropic Poroviscoelasticity and Poroelasticity using Micromechanics and Application to Compression of Orthotropic Rectangular Strips," Journal of Applied Physics, American Institute of Physics, vol. 112, Aug. 30, 2012; 16 pages.

Hoek and Brown, "Empirical Strength Criterion for Rock Masses," Journal of the Geotechnical Engineering Division, Sep. 1980, 20 pages.

Hornby et al., "Anisotropic Effective-Medium Modeling of the Elastic Properties of Shales," Geophysics, vol. 59, No. 10, Oct. 1994, 14 pages.

Hosemann et al., "Mechanical Characteristics of SiC Coating Layer in TRISO Fuel Particles," Journal of Nuclear Materials, vol. 442, published in 2013, 10 pages.

Hosemann et al., "An Exploratory Study to Determine Applicability of Nano-Hardness and Micro-compression Measurments for Yield Stress Estimation," Science Direct, published in 2008, 9 pages.

Hu et al., "Smart Liquid SERS Substrates based on $Fe_3O_4$/Au Nanoparticles with Reversibility Tunable Enhancement Factor for Practical Quantitative Detection," a natureresearch journal, Scientific Reports, Nov. 27, 2014, 10 pages.

Hull and Abousleiman, "New Frontiers in Oil and Gas Exploration," Chapter 10: Insights of the Rev of Source Shale from Nano- and Micromechanics, Springer International Publishing Switzerland, 2016, 29 pages.

Hull et al, "Nanomechanical Characterization of the Tensile Modulus of Rupture of Kerogen-Rich Shale," SPE Journal 2017, 22 (4), pp. 1024-1033, 10 pages.

Hull et al., "Recent Advances in Viscoelastic Surfactants for improved Production from Hydrocarbon Reservoirs," SPE Journal, 2016.

Huseby et al., "SPE-169183-MS: High Quality Flow Information from Tracer Data," Society of Petroleum Engineers (SPE), presented at the SPE Bergen One Day Seminar, Apr. 2, 2014, 9 pages.

Hutchins et al., "SPE-21049: Aqueous Tracers for Oilfield Applications," Society of Petroleum Engineers (SPE), presented at SPE International Symposium on Oilfield Chemistry, Feb. 20-22, 1991, 9 pages.

Hydraulic Fracturing Fluid Product Component Information Disclosure; 2012, 2 pages.

Iqbal et al., "In situ micro-cantilver tests to study fracture properties of NiAl single crystals," Acta Materialia, vol. 60, No. 3, Feb. 2012; 8 pages.

Itasca "Three-dimensional Fast Lagrangian Analysis of Continua (FLAC3D)," available on or before 2012, [retrieved on Jun. 7, 2018], retrieved from URL: < https://www.itascacg.com/software/flac3d>, 4 pages.

itascacg.com' [online], "Particle Flow Code, Version 5.0," Itasca Consulting Group, Inc., available on or before Apr. 11, 2014, [retrieved on May 11, 2018], retrieved from URL: <https://www.itascacg.com/software/pfc>, 5 pages.

Iyengar et al., "Analysis of Crack Propagation in Strain-Softening Beams," Engineering Fracture Mechanics, published in 2002, 18 pages.

Jaeger et al., "Fundamentals of Rock Mechanics," 4th Edition, Wiley, 2007, 486 pages.

(56) References Cited

OTHER PUBLICATIONS

Jia et al., "Highly Efficient Extraction of Sulfate Ions with a Tripodal Hexaurea Receptor," Angew. Chem. Int. Ed., published in 2011, vol. 50, pp. 486-490.
Jianhong et al., "Estimation of the Tensile Elastic Modulus using Brazilian disc by Applying Diametrically Opposed Concentrated Loads," International Journal of Rock Mechanics & Mining Sciences, vol. 46, No. 3, published in 2009, 568-576.
Johnston et al, "Water-in-Carbon Dioxide Microemulsions: An Environment for Hydrophiles Including Proteins," Science, vol. 271, issue 5249, pp. 624-626, Feb. 2, 1996, 3 pages.
Jose et al., "Continuous multi cycle nanoindentation studies on compositionally graded $Ti_{1-x}AI_xN$ multilayer thin films," (XP028230250) Materials Science and Engineering: A, Elsevier, vol. 528, No. 21, Apr. 20, 2011; 7 pages.
Jun et al., "Multifunctional Silver-Embedded Magnetic Nanoparticles as SERS Nanoprobes and Their Applications," Wiley-VCH Verlag GmbH& Co. KGaA, Weinheim, Jan. 4, 2010, 7 pages.
Kelemen et al., "Petroleum Expulsion Part 2. Organic Matter Type and Maturity Effects on Kerogen Swelling by Solvents and Thermodynamic Parameters for Kerogen from Regular Solution Theory," Energy & Fuels, published in 2006, 8 pages.
Kethireddy, "Quantifying the effect of kerogen on Electrical Resistivity Measurements in Organic Rich Source Rocks," Thesis in partial fulfillment of the requirements for the degree of Master of Science, Dec. 2013, 78 pages.
Kim et al., "Numerical analysis of fracture propagation during hydraulic fracturing operations in shale gas systems," International Journal of Rock and Mechanics Mining Sciences vol. 76, 2015.
King, "Thirty Years of Gas Shale Fracturing: What Have We Learned?" SPE-133456, presented at the SPE Annual Technical Conference and Exhibition, Sep. 19-22, 2010, 50 pages.
Klapetek, "Chapter 11: Thermal Measurements," Quantitative Data Processing in Scanning Probe Microscopy: SPE Applications for Nanometrology, 2018, 26 pages.
Kneipp et al., "Single Molecule Detection Using Surface-Enhanced Raman Scattering (SERS)," Physical Review Letters, American Physical Society vol. 78, No. 9, Mar. 3, 1997, 4 pages.
Kolymbas, "Kinematics of Shear Bands," Acta Geotechnica, published in 2009, 4 pages.
Kumar et al., "SPE 159804: Nano to Macro Mechanical Characterization of Shale," SPE International, presented at the SPE Annual Technical Conference and Exhibition, Oct. 8-10, 2012, 23 pages.
Kuperkar et al., "Visoelastic micellar water/CTAB/NaNO3 Solutions: Reology, SANS and cyro-TEM Analysis," Journal of Colloid and Interface Science, vol. 323, 403-409, 2008, 7 pages.
Lam et al., "Experiments and Theory in Strain Gradient Elasticity," J. Mech. And Phys. Of Solids, published in 2003, 32 pages.
Larsen et al., "Changes in the Cross-Link Density of Paris Basin Toarcian Kerogen During Maturation," Organic Geochemistry, published in 2002, 10 pages.
Lee et al, "water-in carbon dioxide emulsions: Formation and stability" Langmuir, 1999, 15(20), pp. 6781-6791, 11 pages.
Li et al., "A review of crosslinked fracturing fluids prepared with produced water," Petroleum 2, vol. 2, Issue 4, Dec. 2016, 11 pages.
Li et al., "Differentiating Open Natural Fractures from Healed Fractures Using the New, High-Definition Oil-Based Mud Microelectrical Imager-Case Studies from Organic Rich Shales," presented at the SPE Annual Technical Conference and Exhibition held in Houston, Texas, Sep. 28-30, 2015, 16 pages.
Li et al., "High-Temperature Fracturing Fluids Using Produced Water with Extremely High TDS and Hardness," IPTC-17797-MS, Dec. 2014, 13 pages.
Li et al., "Mechanical Characterization of Micro/Nanoscale Structures for MEMS/NEMS Applications using Nanoindentation Techniques," Science Direct, published in 2003, 14 pages.
Li et al., "The Brazilian Disc Test for Rock Mechanics Applications: Review and New Insights," Rock Mech Rock Eng, published in 2013, 46: pp. 269-287.
Li et al., "Well Treatment Fluids Prepared With Oilfield Produced Water: Part II," SPE-133379-MS, Sep. 2010, 7 pages.
Liang et al., "An Experimental Study on interactions between Imbibed Fractured Fluid and Organic-Rich Tight Carbonate Source Rocks," SPE-188338-MS, Abu Dhabi International Petroleum Exhibition and Conference, Nov. 13-16, 2017, 14 pages.
Liu and Abousleiman, "Effects of Mudcake and Formation N-Porosity N-Permeability on Wellbore Stability," SPE Journal, Oct. 2018, 25 pages.
Liu and Abousleiman, "Multiporosity/Multipermeability Inclined-Wellbore Solutions with Mudcake Effects," SPE Journal vol. 23, No. 5, Oct. 2018, 25 pages.
Liu and Abousleiman, "N-Porosity and N-Permeability generalized wellbore stability analytical solutions and applications," presented at the 50th US Rock Mechanics/Geomechanics Symposium held in Houston, Texas, Jun. 26-29, 2016, 10 pages.
Liu et al., "Applications of nano-indentation methods to estimate nanoscale mechanical properties of shale reservoir rocks," Journal of Natural Gas Science and Engineering, Elsevier, Amsterdam, NL, vol. 35, Sep. 29, 2016, 10 pages.
Liu et al., "Microstructural and geomechanical analysis of Bakken shale at nanoscale," Journal of Petroleum Science and Engineering, vol. 153, Mar. 23, 2017, 12 pages.
Liu et al., "Safe Drilling in Chemically Active and Naturally Fractured Source Rocks: Analytical Solution and Case Study," Society of Petroleum Engineers/IADC, IADC/SPE Drilling Conference and Exhibition, Fort Worth Texas, Mar. 6-8, 2018.
Liu, "Dimension effect on mechanical behavior of silicon micro—cantilver beams," Measurement, vol. 41, No. 8, Oct. 2008; 11 pages.
Liu, "Elastic Constants Determination and Deformation Observation Using Brazilian Disk Geometry," Experimental Mechanics, published in 2010, 50: pp. 1025-1039.
Liu, "Fracture Toughness Assessment of Shales by Nanoindentation," Thesis for the degree of Master of Science in Civil Engineering, Geotechnical Engineering Masters Projects, University of Massachusetts Amherst, Sep. 2015, 80 pages.
Liu, "Micro—cantilver Testing to Evaluate the Mechanical Properties of Thermal Barrier Coatings," 19th European Conference on Fracture (ECF19): Fracture Mechanics for Durability, Reliability and Safety; Conference Proceedings held Aug. 26-31, 2012, Kazan, Russia; 7 pages.
Long et al., "Chapter Two: Advanced Well Stimulation Technologies," in An Independent Scientific Assessment of Well Stimulation in California, vol. I, Well Stimulation Technologies and their Past, Present and Potential Future Use in California, Jan. 2015, 62 pages.
Low, "Advances in Ceramic Matrix Composites: Second Edition," Processing, properties, and applications of SiC, 2018, 11 pages.
Lu et al, "Fabrication and characterization of ceramic coatings with alumina-silica sol-incorporated a-alumina powder coated on woven quartz fiber fabrics," vol. 39, Issue 6, Aug. 2013, pp. 6041-6050.
Luan et al., "Creation of synthetic samples for phsyical modelling of natural shale," Geophysical Prospecting vol. 64, Jul. 2016, 17 pages.
Lyngra et al. "Heavy Oil Characterization: Lessons Learned During Placement of a Horizontal Injector at a Tar/Oil Interface," SPE-172673-MS, Society of Petroleum Engineers, presented at the SPE Middle East Oil & Gas Show and Conference, Bahrain, Mar. 8-11, 2015, 20 pages.
Mahabadi et al., "A novel approach for micro-scale characterization and modeling of geomaterials incorporating actual material heterogeneity," (XP002689941) Geophysical Research Letters, American Geophysical Union, vol. 39, No. 1, L01303, Jan. 1, 2012; 6 pages.
Mahmoud et al., "Removal of Pyrite and Different Types of Iron Sulfide Scales in Oil and Gas Wells without H2S Generation," (IPTC-18279-MS) Presented at the International Petroleum Technology Conference (IPTC), Doha, Qatar, Dec. 6-9, 2015; 8 pages.
Maio et al., "Measuring Fracture Toughness of Coatings using Focused-ion-beam-machined Microbeams," published in 2004, 4 pages.
Marchetti et al., "Fluorous affinity chromatography for enrichment and determination of perfluoroalkyl substances," Annual Review of Analytical Chemistry' vol. 84, Jul. 19, 2012, 8 pages.

(56) References Cited

OTHER PUBLICATIONS

Maxwell, "Microseismic hydraulic fracture imaging: The path toward optimizing shale gas production," The Leading Edge, Mar. 2011, 6 pages.

McMahon et al., "First 100% Reuse of Bakken Produced Water in Hybrid Treatments Using Inexpensive Polysaccharide Gelling Agents," SPE-173783-MS, Apr. 2015, 9 pages.

Mehrabian and Abousleiman, "Generalized Biot's Theory an Mandel's Problem of Multiple Porosity and Multiple-Permeability Poroelasticity," Journal of Geological Research: Solid Earth, vol. 119, No. 4, 2014, 19 pages.

Mesa, "Spherical and rounded cone nano indenters," Micro Star Technologies Inc., available on or before Jan. 23, 2018, 24 pages.

Meyers et al., "Point load testing of drill cuttings from the determination of rock strength," ARMA-05-712, 40th U.S. Symposium on Rock Mechanics (USRMS), Alaska Rocks 2005, American Rock Mechanics Association, Jun. 25-29, 2005, 2 pages, ABSTRACT.

Middleton et al, "Shale gas and non-aqueous fracturing fluids: Opportunities and challenges for supercritical CO2," Applied Energy 2015, 147, pp. 500-509, 10 pages.

Montgomery and Smith, "Hydraulic Fracturing: History of Enduring Technology," Journal of Petroleum Technology, Dec. 2010, 7 pages.

Montgomery, "Fracturing Fluids," Chapter 1, Effective and Sustainable Hydralic Fracturing, Intech, the proceedings of the International Conference for Effective and Sustainable Hydraulic Fracturing (HF2103) on May 20-22, 2013, 23 pages.

Montgomery, Carl "Fracturing Fluid Components", Chapter 2, Intech open science | open minds, Montgomery ; licensee Intch. 2013, 21 pages; http://dx.doi.oorg/10.5772/56422.

Moyer, "A Case for Molecular Recognition in Nuclear Separations: Sulfate Separation from Nuclear Wastes," Inorganic Chemisty, copyright 2012, pp. 3473-3490.

Moyner et al., "The Application of Flow Diagnostics for Reservoir Management," Society of Petroleum Engineers (SPE), Apr. 2015, 18 pages.

Nguyen and Abousleiman, "Poromechanics Response of Inclined Wellbore Geometry in Chemically Active Fractured Porous Media," Journal of Engineering Mechanics, vol. 135, No. 11, Nov. 2005, 14 pages.

Oliver and Pharr, "An improved technique for determining hardness and elastic modulus using load and displacement sensing indentation experiments," Journal of Materials Research, vol. 7, No. 6, Jun. 1992, 20 pages.

Oliver and Pharr, "Measurement of hardness and elastic modulus by instrumented indentation: Advances in understanding and refinements to methodology," Journal of Materials Research, vol. 19, No. 1, Jan. 2004, 18 pages.

Ortega et al., "The Effect of the Nanogranular Nature of Shale on their Poroelastic Behavior," Acta Geotechnica, published in 2007, 28 pages.

Ortega et al., "The Nanogranular Acoustic Signature of Shale," Geophysics, vol. 74, No. 3, May-Jun. 2009, 20 pages.

Osman and Pao, "Mud Weight Predition for Offshore Drilling," 8 pages.

Ottesen, "Wellbore Stability in Fractured Rock," presented at the IADC/SPE Drilling Conference and Exhibition, New Orleans, Louisiana, Feb. 2-4, 2010, 8 pages.

Pant, "Nanoindentation characterization of clay minerals and clay-based hybrid bio-geomaterials," disseration for degree of Doctor of Philosophy in the Department of Civil and Environmental Engineering at the Louisiana State University and Agricultural and Medical College, Dec. 2013, 111 pages.

Passey et al., "From Oil-Prone Source Rock to Gas-Producing Shale Reservoir—Geologic and Petrophysical Characterization of Unconventional Shale-Gas Reservoirs," Society of Petroleum Engineers International, CPS/SPE International Oil & Gas Conference and Exhibition, Beijing, China, Jun. 8-10, 2010, 29 pages.

Patel et al., "Analysis of US Hydraulic Fracturing Fluid System and Proppant Trends," SPE 168645, presented at the SPE Hydraulic Fracturing technology Conference, Feb. 4-6, 2014, 20 pages.

Petoud et al., "Brilliant SM, Eu, Tb, and Dy Chiral Lanthanide Complexes with Strong Circularly Polarized Luminescence," Journal fo the American Chemical Society (JACS), Dec. 15, 2006, 7 pages.

Podio et al., "Dynamic Properties of Dry and Water-Saturated Green River Shale under Stress," Jun. 11, 1968, SPE 1825, 16 pages.

Pollard, D. D.and Fletcher, R.C., "Fundamentals of Structural Geology," Cambridge University Press, Sep. 1, 2005; p. 291.

Pollock and Hammiche, "Micro-thermal analysis: techniques and applications," Journal of Physics D: Applied Physics, vol. 34.9, 2001, 31 pages.

Poon et al., "An Analysis of Nanoindentation in Linearly Elastic Solids," International Journal of Solids and Structures, vol. 45, No. 24, Dec. 1, 2008; 16 pages.

Qin et al, "Applicability of nonionic surfactant alkyl polyglucoside in preparation of liquid CO2 emulsion," Journal of CO2 Utilization, 2018, 26, pp. 503-510, 8 pages.

Rajbanshi et al., "Sulfate Separation from Aqueous Alkaline Solutions by Selective Crystallization of Alkali Metal Coordination Capsules," Cryst. Growth Des., published in 2011, pp. 2702-2706.

Ribeiro and Sharma, "Fluid Selection for Energized Fracture Treatments," SPE 163867, presented at the SPE Hydraulic Fracturing Technology Conference, Feb. 4-6, 2013, 11 pages.

Richard et al, "Slow Relaxation and Compaction of Granular Systems," Nature Materials, vol. 4, Feb. 2005, 8 pages.

Rodriguez et al., "Imagining techniques for analyzing shale pores and minerals," National Energy Technology Laboratory, Dec. 2, 2014, 44 pages.

Rostami et al., "DABCO tribromide immobilized on magnetic nanoparticle as a recyclable catalyst for the chemoselective oxidation of sulfide using H2O2 under metaland solvent-free condition," Catal. Commun. 2014, 43, 16-20, 20 pages.

Rowan et al., "Dynamic Covalent Chemistry," Angewante Chemie International Edition, Mar. 15, 2002, 55 pages.

Ryoo et al, "Water-in-Carbon Dioxide Microemulsions with Methylated Branched Hydrocarbon Surfactants," Industrial & Engineering Chemistry Research 2003 42 (25), pp. 6348-6358, 11 pages.

Sagisaka et al, "A New Class of Amphiphiles Designed for Use in Water-in-Supercritical CO2 Microemulsions," Langmuir 2016 32 (47), pp. 12413-12422, 44 pages.

Sagisaka et al, "Effect of Fluorocarbon and Hydrocarbon Chain Lengths In Hybrid Surfactants for Supercritical CO2," Langmuir 2015 31 (27), pp. 7479-7487, 36 pages.

Sagisaka et al, "Nanostructures in Water-in-CO2 Microemulsions Stabilized by Double-Chain Fluorocarbon Solubilizers," Langmuir 2013 29 (25), pp. 7618-7628, 11 pages.

Santarelli et al., "Drilling through Highly Fractured Formations: A Problem, a Model, and a Cure," presented at the 67th Annual Technical Conference and Exhibition of the Society of Petroleum Engineers, Washington D.C., Oct. 4-7, 1992, 10 pages.

Sayed and Al-Muntasheri, "A Safer Generation of Wettability Alteration Chemical Treatments," SPE-184566-MS, presented at the SPE International Conference on Oilfield Chemistry, Apr. 3-5, 2017, 25 pages.

Selvin et al., "Principles and biophysical applications of lanthanide-based probes," Annual Review of Biophysics and Biomolecular Structure, Jun. 2002, 28 pages.

Sepulveda et al., "Oil-Based Foam and Proper Underbalanced-Drilling Practices Improve Drilling Efficiency in a Deep Gulf Coast Well," SPE 115536, presented at the 2008 SPE Annual Technical Conference and Exhibition in Denver, Colorado, Sep. 21-24, 2008, 8 pages.

Serres-Piole et al., "Water tracers in oilfield applications: Guidelines," Elsevier Ltd., Journal of Science and Engineering, Nov. 2012, 18 pages.

Shahid et al., "Natural-fracture reactivation in shale gas reservoir and resulting microseismicity," Journal of Canadian Petroleum Technology vol. 54.06, 2015.

(56) References Cited

OTHER PUBLICATIONS

Shin et al., "Development and Testing of Microcompression for Post Irradiation Characterization of ODS Steels," J. Nuclear Materials, published in 2014, 6 pages.
Shook et al., "SPE 124614: Determining Reservoir Properties and Flood Performance from Tracer Test Analysis," Society of petroleum Engineers (SPE), presented at SPE Annual Technical Conference and Exhibition, Oct. 4-7, 2009, 19 pages.
Shukla et al., "ARMA 13-578: Nanoindentation Studies on Shales," ARMA, presented at the 47th US Rock Mechanics/Geomechanics Symposium, Jun. 23-26, 2013, 10 pages.
Sierra et al., "Woodford Shale Mechanical Properties and the Impacts of Lithofacies," ARMA 10-461, copyright 2010, 10 pages.
Singh et al., "Facies classification based on seismic waveform," presented at the 5th Conference & Exposition on Petroleum Geophysics, Jan. 15-17, 2004, 7 pages.
Siskin et al., "Reactivity of organic compounds in hot water: geochemical and technological implications," Science, Oct. 11, 1991, 8 pages.
Slatt et al., "Merging Sequence Stratigraphy and Geomechanics for Unconventional Gas Shales," The Leading Edge, Mar. 2011, 8 pages.
Slatt et al., "Outcrop/Behind Outcrop (Quarry), Multiscale Characterization of the Woodford Gas Shale," copyright 2011, 22 pages.
Sone et al., "Mechanical properties of shale-gas reservoir rocks—Part 2: Ductile creep, brittle strength, and their relation to the elastic modulus," 2013, Geophysics, vol. 78, No. 5, 10 pages.
Song et al., "SERS-Encoded Nanogapped Plasmonic Nanoparticles: Growth of Metallic Nanoshell by Templating Redox-Active Polymer Brushes," Journal of the American Chemical Society (JACS), Apr. 28, 2014, 4 pages.
Soni, "LPG-Based Fracturing: An Alternative Fracturing Technique in Shale Reservoirs," IADC/SPE-170542-MS, IADC/SPE Asia Pacific Drilling Technology Conference, Aug. 25-27, 2014, 7 pages.
Stiles et al., "Surface-enhanced Raman Spectroscopty," Annual Review of Analytical Chemistry, Mar. 18, 2008, 29 pages.
Tabatabaei et al., "Well performance diagnosis with temperature profile measurements," in SPE Annual Technical Conference and Exhibition, Society of Petroleum Engineers, Oct. 30-Nov. 2, 2011, published Jan. 2011, 16 pages.
Tian et al., "Off-Resonant Gold Superstructures as Ultrabright Minimally Invasive Surface-Enhanced Raman Scattering (SERS) Probes," American Chemical Society, Jul. 2015, 7 pages.
Ulboldi et al., "Rock strength measurement on cuttings as input data for optimizing drill bit selection," SPE 56441, presented at the 1999 SPE Annual Technical Conference and Exhibition in Houston, Texas, Oct. 3-6, 1999, 9 pages.
Ulm et al., "Material Invariant Poromechanics Properties of Shales," published in 2005, 8 pages.
Ulm et al., "The Nanogranular Nature of Shale," Acta Geotechnica, published in 2006, 12 pages.
Vanlandingham, "Review of Instrumented Indentation," Journal of Research of the National Institute of Standards and Technology, vol. 108, No. 4, Jul.-Aug. 2003; 17 pages.
Vernik et al., "Ultrasonic Velocity and Anisotropy of Hydrocarbon Source Rocks," Geophysics, vol. 57, No. 5, May 1992, 9 pages.
Walters et al., "Inetic rheology of hydraulic fracturing fluids," SPE Annual Technical Conference and Exhibition, Society of Petroleum Engineers, 2001.
Walters et al., "Kinetic rheology of hydraulic fracturing fluids." SPE Annual Technical Conference and Exhibition. Society of Petroleum Engineers, Sep. 2001.
Wang et al, "A Feasibility Analysis on Shale Gas Exploitation with Supercritical Carbon Dioxide," Energy Sources, Part A: Recovery, Utilization, and Environmental Effects 2012, 34 (15), pp. 1426-1435, 11 pages.
Wang et al. "Iron Sulfide Scale Dissolvers: How Effective Are They?", SPE 168063, Society of Petroleum Engineers, presented at the SPE Saudi Arabia section Annual Technical Symposium and Exhibition, May 19-22, 2013, 22 pages.
Wang et al., "A Numerical Study of Factors Affecting the Characterization of Nanoindent ation on Silicon," Materials Science and Engineering: A, vol. 447, No. 1, Feb. 25, 2007; 10 pages.
Wang et al., "The Flattened Brazilian Disc Specimen Used for Testing Elastic Modulus, Tensile Strength and Fracture Toughness of Brittle Rocks: Analytical and Numerical Results," International Journal of Rock Mechanics and Mining Sciences, 2004, vol. 41, Issue 2: pp. 245-253.
Warpinski, "Understanding Hydraulic Fracture Growth, Effectiveness, and Safety Through Microseismic Monitoring," Intech, May 17, 2013, 14 pages.
Warren and Root, "The Behavior of Naturally Fractured Reservoirs," SPE Journal, vol. 3, No. 3, pp. 245-255, Sep. 1963, 11 pages.
Wegst et al., "Bioinspired structural materials," Nature Materials, vol. 14, Jan. 2015, 14 pages.
Wenk et al., "Preferred Orientation and Elastic Anisotropy of Illite-Rich Shale," Geophysics, vol. 72, No. 2, Mar.-Apr. 2007, 7 pages.
Wessels et al., "Identifying fault activation during hydraulic stimulation in the Barnett shale: source mechanisms, b values, and energy release analyses of microseismicity," presented at the SEG San Antonio 2011 Annual Meeting, Sep. 18-23, 2011, 5 pages.
Wilson and Aifantis, "On the Theory of Consolidation with Double Porosity," International Journal of Engineering Science, vol. 20, No. 9, 1982, 27 pages.
Wilson et al., "Fracture testing of bulk silicon microcantilever beams subjected to a side load," Journal of Microelectromechanical Systems, vol. 5, No. 3, Sep. 1996; 9 pages.
Wu et al., "A reusable biosensor chip for SERS-fluorescence dual mode immunoassay," Proc. SPIE 9543, Third International Symposium on Laser Interaction with Matter, 954317, May 4, 2015, 6 pages.
Wu et al., "A SERS-Assisted 3D Barcode Chip for High-Throughput Biosensing," Small Journal vol. 11, No. 23, Jun. 11, 2015, 9 pages.
Wurster et al., "Characterization of the fracture toughness of microsized tungsten single crystal notched specimens," Philosophical Magazine, vol. 92, No. 14, May 2012; 23 pages.
Wurzenberger et al., "Nitrogen-Rich Copper(II) Bromate Complexes: an Exotic Class of Primary Explosives," Journal of Inorganic Chemistry, vol. 57, 2018, 10 pages.
Xu et al., "Anisotropic elasticity of jarosite: A high-P synchrotron XRD study," American Mineralogist, vol. 95, Issue 1, 2010, 5 pages.
Xu et al.., "Measurement of two-photon excitation cross sections of molecular fluorophores with data from 690 to 1050 nm," Journal of the Optical Society of America B, Mar. 1996, 11 pages.
Yang et al., "Nanoscale geochemical and geomechanical characterization of organic matter in shale," Nature Communications, vol. 8, 2179, Dec. 19, 2017, 9 pages.
Zamberi et al., "SPE 166005: Improved Reservoir Surveillance Through Injected Tracers In A Saudi Arabian Field: Case Study," Society of Petroleum Engineers (SPE), presented at SPE Reservoir Characterization and Simulation Conference and Exhibition, Sep. 16-18, 2013, 15 pages.
Zemel, "Chapter 3: Interwell Water Tracers," Tracers in the Oil Field, vol. 43, 1st Edition, Elsevier Science, Jan. 13, 1995, 47 pages.
Zeszotarski et al., "Imaging and Mechanical Property Measurements of Kerogen via Nanoindentation," Geochimica et Cosmochimica Acta, vol. 68, No. 20, Oct. 15, 2004, 7 pages.
Zhou et al., "Upconversion luminescent materials: advances and applications," Chem Rev., Jan. 14, 2015, 71 pages.
Zielinski et al, "A Small-Angle Neutron Scattering Study of Water in Carbon Dioxide Microemulsions," Langmuir 1997, 13(15), pp. 3934-3937, 4 pages.
Zimmerman and Bodvarsson, "Hydraulic Conductivity of Rock Fractures," transport in Porous Media, vol. 23, Jan. 1996, 31 pages.

\* cited by examiner

REACTIVE HYDRAULIC FRACTURING FLUID

CROSS-REFERENCE TO RELATED APPLICATIONS

This application is a divisional of and claims priority to U.S. application Ser. No. 16/731,574 filed on Dec. 31, 2019, the entire contents of which are incorporated by reference herein.

TECHNICAL FIELD

This disclosure relates to hydraulic fracturing.

BACKGROUND

Hydraulic fracturing employs fluid and material to generate fractures in a subterranean formation to stimulate production from oil and gas wells. Hydraulic fracturing is a well-stimulation technique in which rock is fractured by a pressurized liquid that may be a fracturing fluid. The process can involve the pressure injection of fracturing fluid into a wellbore to generate cracks in the deep-rock formations through which natural gas, petroleum, and brine will flow more freely. The fracturing typically generates paths that increase the rate at which production fluids, such as crude oil or natural gas, can be produced from the reservoir formations. The amount of increased production may be related to the amount of fracturing. Proppant may be employed to maintain the fractures as pressure depletes in the well during hydrocarbon production. The proppant may resist formation closure stresses to keep fractures open.

Hydraulic fracturing may allow for the recovery of crude oil and natural gas from unconventional formations that geologists once believed were impossible to produce. Unconventional source rocks may be organic-rich sedimentary deposits, such as shales and mud rocks. The organic components of the source shale may include hydrocarbon-source material kerogen and kerogen-produced components bitumen and pyrobitumen.

SUMMARY

An aspect relates to a method of hydraulic fracturing. The method includes providing a hydraulic fracturing fluid through a wellbore into a subterranean formation. The hydraulic fracturing fluid includes water, a nonpolar fluid, and a surfactant. The hydraulic fracturing fluid includes an inorganic oxidizer in the water. The method includes hydraulically fracturing the subterranean formation with the hydraulic fracturing fluid. The method includes oxidizing organic material in the subterranean formation with the hydraulic fracturing fluid.

Another aspect relates to a method of hydraulic fracturing. The method includes providing a hydraulic fracturing fluid through a wellbore into a subterranean formation. The hydraulic fracturing fluid includes an aqueous phase and a non-aqueous phase. The aqueous phase includes water and an inorganic oxidizer in the water. The method includes hydraulically fracturing the subterranean formation with the hydraulic fracturing fluid. The method includes oxidizing organic material in the subterranean formation with the hydraulic fracturing fluid. The oxidizing of the organic material degrades the organic material. The organic material includes kerogen.

Yet another aspect relates to a hydraulic fracturing fluid for hydraulic fracturing a subterranean formation. The hydraulic fracturing fluid includes: (1) water at less than 50 volume percent (vol %) of the hydraulic fracturing fluid; (2) a fluid at greater than 50 vol % of the hydraulic fracturing fluid; (3) an inorganic oxidizer in the water at a molality of at least 10 millimolar (mM) in the water; and (4) a surfactant.

The details of one or more implementations are set forth in the accompanying drawings and the description below. Other features and advantages will be apparent from the description and drawings, and from the claims.

BRIEF DESCRIPTION OF DRAWINGS

Like reference numbers and designations in the various drawings indicate like elements.

DETAILED DESCRIPTION

Figure 1:
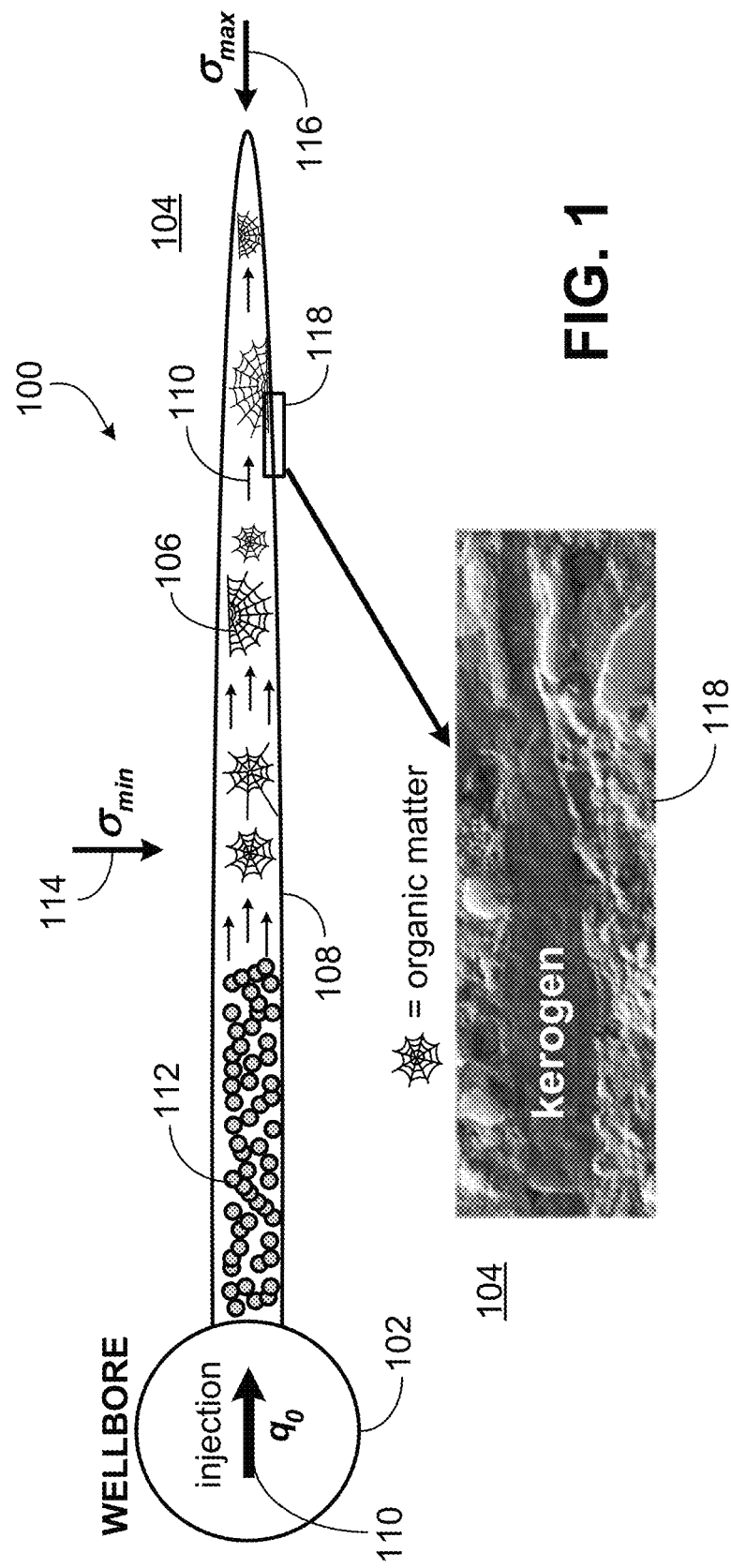
FIG. 1 is a diagram of a well having a wellbore formed in a subterranean formation having organic matter, such as kerogen.

Some aspects of the present disclosure are directed to employing a hydraulic fracturing fluid that is reactive to break down kerogen in a subterranean formation during hydraulic fracturing. Embodiments include hydraulic fracturing fluids that are reactive in bearing an oxidizing component(s) (oxidizer). The hydraulic fracturing fluid also includes water and an additional fluid. The water may have an inorganic oxidizer.

The fluid (in addition to the water) may be gas or hydrophobic liquid (generally immiscible with water), or both. This additional fluid as a gas may be an inert gas (e.g., $CO_2$) in a nonpolar gas phase of the hydraulic fracturing fluid. The additional fluid as a liquid (generally immiscible with water) may be oil, liquid carbon dioxide ($CO_2$), or supercritical $CO_2$, and in a nonpolar phase (non-aqueous phase) of the fracturing fluid. The oil may generally be inert. The oil may be, for example, mineral oil. The supercritical $CO_2$ may behave as a liquid in certain respects.

An advantage of the present fracturing fluid may include reduction of water use in hydraulic fracturing. Further, if the inert gas or liquid $CO_2$ (or supercritical $CO_2$) is employed in the fracturing fluid, another advantage may be the beneficial effect of the inert gas or liquid $CO_2$ (or supercritical $CO_2$) on hydrocarbon recovery in displacing hydrocarbons from the kerogen and formation.

The hydraulic fracturing fluid may have an external phase (also labeled as continuous phase or carrier phase) and an internal phase (also labeled as a discontinuous phase or dispersed phase). The fracturing fluid may have a surfactant.

The water (aqueous phase) may be the external phase or the internal phase. Again, the water may have an inorganic oxidizer.

The hydraulic fracturing fluid may be a foam, emulsion, foamed emulsion, or liquid-carrying gas. The foam, emulsion, foamed emulsion, or liquid-carrying gas may be reactive or oxidizing.

As indicated, the oxidizer(s) in the fracturing fluid may include an inorganic oxidizer in an aqueous (polar) phase of the fracturing fluid. The fracturing fluid may additionally include an oxidizer in another phase. The other phase may be a non-aqueous phase, hydrophobic phase, nonpolar phase, nonpolar gas phase, nonpolar solvent phase, water-immiscible phase, water-immiscible liquid phase, etc.

In particular for examples with the fracturing fluid having a nonpolar gas phase (e.g., inert gas, such as $CO_2$), the additional oxidizer may be a reactive gas (e.g., chlorine dioxide) in the nonpolar gas phase. In examples with the fracturing fluid having a water-immiscible phase that is liquid (e.g., hydrophobic liquid such as oil or $CO_2$) or supercritical (e.g., $CO_2$), the additional oxidizer may be an organic oxidizer.

The oxidizing fracturing fluid via the oxidizer(s) breaks down kerogen in the subterranean formation during hydraulic fracturing. As mentioned, a benefit may include reduction of water use as compared to typical hydraulic fracturing. Another benefit may be the effect of the non-aqueous phase on hydrocarbon recovery in displacement of hydrocarbons from the kerogen-laden formation.

Production from unconventional source-rock formations has become economically viable. The technology for accessing these reservoirs continues to advance as the industry improves drilling, completion, and stimulation techniques. Unconventional source-rock reservoirs differ from conventional reservoirs at least due to the presence of the hydrocarbon source material (for example, kerogen and kerogen-produced components) in unconventional source-rock reservoirs. This hydrocarbon source material as irregular organic matter can represent, for example, 5-10 weight percent (wt %) of the sedimentary source-rock formation or 10-20 volume percent (vol %) of the sedimentary source-rock formation. An assortment of minerals are woven and compacted together with the organic matter (for example, kerogen) resulting in a complex hierarchical structure with toughness and strength characteristics similar to other natural materials. The tensile characteristics of the organic matter have been demonstrated by nanoindentation of organic-rich shale micro/nano-cantilever source-shale beams tested under a scanning electron microscope (SEM). The chemomechanical characteristics of the organic matter implicate a problematic role of the organic matter in the tensile stresses in hydraulic fracturing and in overall mechanical and chemical operational success of the fracturing. The interwoven organic matter that the fracturing fluid encounters as the fracture extends into the source rock formation is further discussed with respect to FIG. 1.

FIG. 1 is well 100 having a wellbore 102 formed in a subterranean formation 104 having organic matter 106 (organic material), such as kerogen. The wellbore 102 is depicted as a circular cross section. The subterranean formation 104 is a geological formation in the Earth crust and may be an unconventional source-rock formation having hydrocarbon. The subterranean formation 104 may be an organic-rich shale zone. The spider-web symbol represents the presence of the organic matter 106.

In FIG. 1, a fracture 108 is being formed via injection of a fracturing fluid 110 (stimulation fluid) from the Earth surface through the wellbore 102 into the subterranean formation 104. The fracturing fluid 110 may be injected at a specified flow rate ($q_o$). The flow rate ($q_o$) may be specified as a volumetric flow rate or mass flow rate. The fracturing fluid 110 may include proppant 112, such as sand or ceramic proppant. The fracture 108 may propagate perpendicular to a minimum principal stress 114 of the formation 104 and in a direction against a maximum principal stress 116 of the formation.

The schematic in FIG. 1 depicts the hydraulic fracture 108 extending from the wellbore 102. The fracturing fluid 110 system encounters the ductile organic matter 106 illustrated as spider webs. The presence of the organic matter 106 at the fracture face 118 may restrict the generation of permeable channels from the subterranean formation 104 into the fracture 108. Thus, the organic matter 106 may inhibit the subsequent production of hydrocarbon from the formation 104 into and through the fracture 108 to the wellbore 102 and Earth surface. The fracture face 118 may be an interface of the forming fracture 108 with the subterranean formation 104. Conventional hydraulic-fracturing stimulation fluids typically do not address challenges of fracturing organic-rich shale zones. The polymer-like organic material 106 may be intertwined within the organic material and with the rock. The organic material 106 affects fracturing (fracture) behavior and reduces resulting hydraulic conductivity.

Hydraulic fracturing fluids may include polymers or crosslinkers for viscosifying the fracturing fluids as proppant-carrying fluids. Fracturing fluids (or stimulation fluid chemicals) may also include additives, such as polymer breakers, biocides, clay swelling inhibitors, and scale inhibitors. Among the most commonly-used fracturing fluids for unconventional formations are slickwater systems incorporating friction-reducing synthetic polymers that facilitate the pumping of stimulation fluids at large rates (for example, at least 100 barrels per minute). Moreover, the incorporation of gas into fracturing fluids may reduce or eliminate water altogether as a component of the fracturing fluid.

To address the challenge of improving hydraulic fracturing in unconventional source-rock reservoirs, embodiments of the present techniques include reactive fluids that can break down the polymer nature of the organic matter 106 on the hydraulic fracture faces 118. At the fracture face 118, organic matter 106 (for example, kerogen) is beneficially cracked or fragmented open due to exposure to oxidizing conditions (for example, aqueous oxidizing conditions). Techniques to implement the oxidizing conditions via a fracturing fluid 110 include a fracturing fluid having, for example, an inorganic oxidizer in aqueous fluid. The fracturing fluid may additionally have an organic oxidizer in oil, liquid $CO_2$, or supercritical $CO_2$. The fracturing fluid may have a reactive gas (oxidizer) in an inert gas (if employed) of the fracturing fluid.

Figure 2:
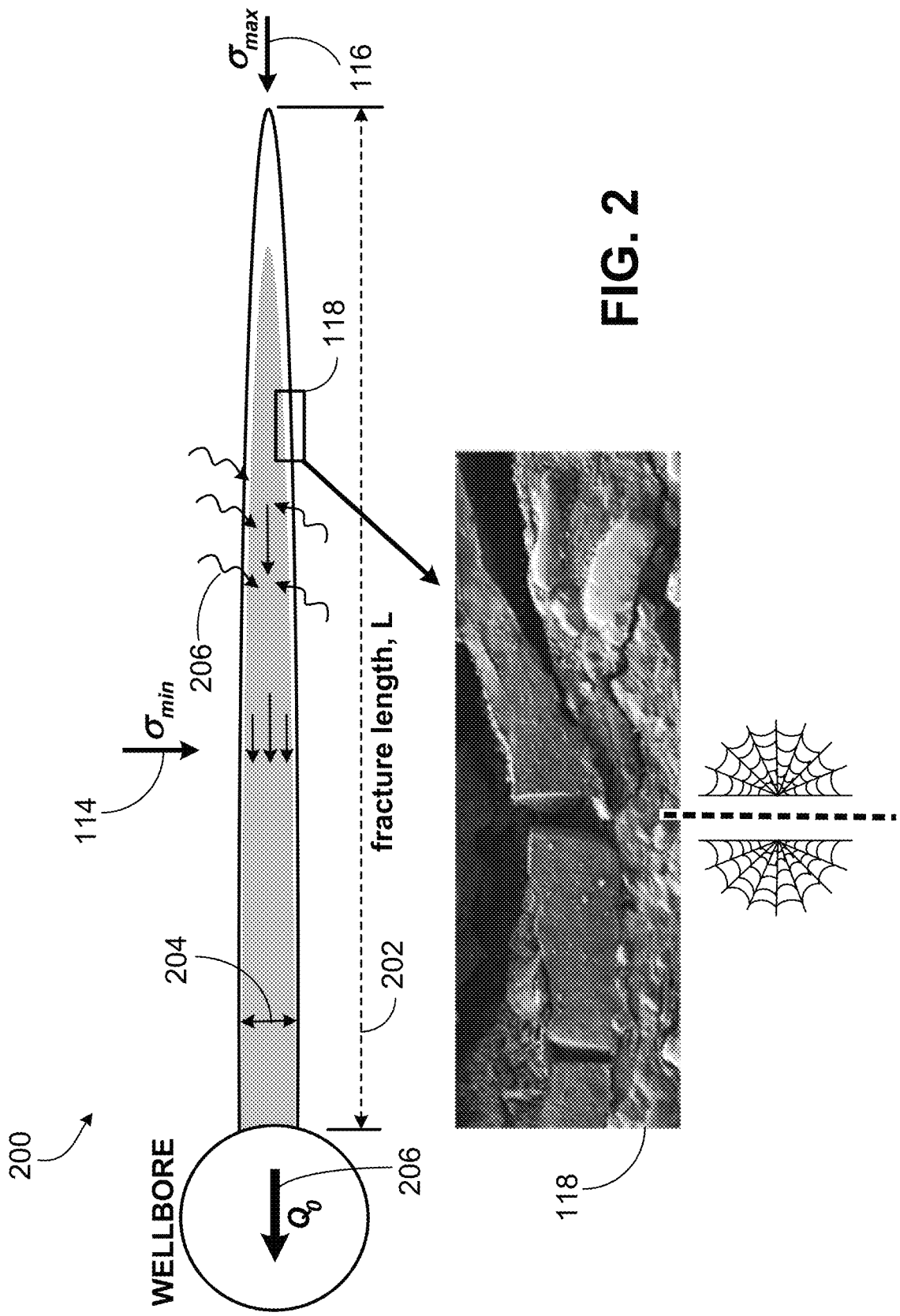
FIG. 2 a diagram of the well of FIG. 1 after a hydraulic fracture is formed and with the well in production.

Thus, the fracturing fluids include reactive fluids having or that are an oxidizer that can break down the polymer nature of the organic matter on the hydraulic fracture faces. The fracturing fluids having an oxidizer(s) can include surfactants to promote forming of a dispersed phase in a continuous phase and keep any proppant suspended. FIG. 2 provides a schematic of kerogen that has cracked open as a result of exposure to oxidizing conditions (for example, aqueous oxidizing conditions). Though the merits of fracturing with an oxidizer-containing fluid generally are indicated, such a fluid if an aqueous fluid relies on freshwater that is sometimes scarce depending on the well location. Further, the use of water in some formations may cause damage. Also, the aqueous fluid itself may have little interaction with the kerogen organic matter. On this point, kerogen holds onto light-chain hydrocarbons. The lack of interaction between water and kerogen may resist displacement of this hydrocarbon by the water. In response, embodiments give a fracturing fluid that can have both water and inert gas, both water and oil, or both water and liquid $CO_2$. The fracturing fluid may be a foam, an emulsion, a foamed emulsion, or a liquid-carrying gas, and so on.

Embodiments include a hydraulic fracturing fluid (or treatment fluid) having water (aqueous phase) at less than 50 volume percent (vol %), another fluid (e.g., non-aqueous phase) at greater than 50 vol %, and a surfactant. The water may have an inorganic oxidizer. The water (aqueous phase) may be a continuous phase (external phase or carrying phase) in the fracturing fluid or a dispersed phase (internal phase or discontinuous phase) in the fracturing fluid. In some embodiments, the other fluid (e.g., >50 vol %) may be generally immiscible with the water (e.g., <50 vol %) in the fracturing fluid.

The other fluid (e.g., non-aqueous and/or nonpolar) may be a hydrophobic liquid (for example, oil or liquid $CO_2$) or hydrophobic supercritical fluid (e.g., $CO_2$), with or without an organic oxidizer. For the other fluid being a liquid (or supercritical fluid) immiscible with water, the fracturing fluid may be an emulsion.

The other fluid may be an inert gas (for example, $CO_2$, ethane, propane, or nitrogen, or mixtures thereof) with or without a reactive gas as an oxidizer. In examples with the other fluid being inert gas as a dispersed phase, the fracturing fluid may be a foam.

In examples with the other fluid being inert gas as a continuous phase, the inert gas may carry the water, and the fracturing fluid may be labeled as a liquid-carrying gas. The water may be entrained in the inert gas.

For the other fluid including both a gas and a liquid (or supercritical fluid) immiscible with water, the fracturing fluid may be a foamed emulsion. For instance, the gas and the liquid (or supercritical fluid) immiscible with water may be dispersed in the water to form the foamed emulsion.

Additives (for example, a viscosifier) may be incorporated for proppant suspension in fracturing applications at the selected water ratios (for example, water-to-gas ratio). Fluids of this compositional range employ less water than water-based systems, employ less surfactant than typical hydraulic fracturing fluids having surfactant, and accommodate oxidizers of varying solubility arising from the mixed-solvent nature of the fracturing fluid. As indicated, the fracturing fluid may be foam, emulsion, foamed-emulsion, or liquid-carrying gas.

FIG. 2 is a well 200 that is the well 100 of FIG. 1 after the hydraulic fracture 108 is formed and with the well 200 in production. FIG. 2 depicts the hydraulic fracture 108 extending from the wellbore 102. The fracture 108 has a length 202 and width 204. The fracturing fluid 110 (FIG. 1) that formed the fracture 108 was reactive fracturing fluid having an oxidizer that attacked the organic matter 106. Thus, the fracturing fluid 110 caused organic matter 106 to crack open to generate permeable channels from the formation 104 into the fracture 108. Therefore, conductivity is increased from the formation 104 through the fracture 108 into the wellbore 102. The well 200 as depicted is in production phase with produced hydrocarbon 206 flow from the subterranean formation 104 through the fracture 108 and wellbore 102 to the Earth surface. The flow rate of the produced hydrocarbon 206 may be labeled as $Q_o$ and may be characterized as a volumetric flow rate or mass flow rate.

As discussed, the present hydraulic fracturing-fluid systems may include a reactive component(s) (one or more oxidizers) for breaking down organic matter 106, such as kerogen, in the subterranean formation 104. Embodiments hydraulically fracture unconventional source-rock formations. These reactive fracturing fluids may contain a specified amount of oxidizer that can break down organic material (for example, kerogen) in the subterranean formation. As for oxidizer selection, the oxidizers employed in this application demonstrate reactivity toward kerogen. To this end, salts of chlorate and bromate are examples. Both are reactive toward kerogen. Further, reactive gases, such as chlorine dioxide, are applicable as oxidizers.

The present hydraulic fracturing fluid includes at least one oxidizer, a surfactant (or amphilic block copolymer), and at least two phases generally immiscible with respect to each other. One phase is a continuous phase (external or carrier phase) and the other phase is a discontinuous phase (internal or dispersed phase). One phase may be hydrophobic and the other phase hydrophilic.

In examples of the fracturing fluid as a foam, the foam may have a nonpolar inert gas (and any reactive gas) as the discontinuous phase in or dispersed in water (aqueous phase) that is the continuous phase. The fracturing fluid as a liquid-carrying gas may have water (aqueous phase) as the discontinuous phase in or dispersed in a nonpolar inert gas (and any reactive gas) that is the continuous phase.

In examples of the fracturing fluid as an emulsion, the emulsion may have a hydrophobic or nonpolar liquid (having an organic oxidizer in some implementations) as the discontinuous phase in or dispersed in water (aqueous phase) that is the continuous phase. The nonpolar liquid may be, for example, oil or $CO_2$. The $CO_2$ in the emulsion may be a liquid or supercritical fluid. The supercritical $CO_2$ may resemble a liquid in certain respects, such as in regard to density. In other examples, the fracturing fluid as an emulsion may have the water (aqueous phase) as the discontinuous phase in or dispersed in the nonpolar liquid that is the continuous phase.

In examples of the hydraulic fracturing fluid as a foamed emulsion, the foamed emulsion may include both inert gas and liquid (immiscible with water) dispersed in water. In the foamed emulsion, the water is the continuous phase. The (1) inert gas (optionally having a reactive gas as an oxidizer) and (2) liquid (immiscible with water and optionally having an organic oxidizer) may each be respective discontinuous phases in or dispersed in water (having an organic oxidizer) that is the continuous phase. The liquid immiscible in water may be, for example, oil, liquid $CO_2$, or supercritical $CO_2$ (having behaviors of liquid).

In various embodiments of the hydraulic fracturing fluid, a surfactant may absorb to the boundary between two immiscible phases. Surfactant molecules may be amphiphilic in having a hydrophic part (hydrophobic tail) and a hydrophilic part (polar head group). The surfactant may absorb to the interface between a hydrophobic phase (for example, nonpolar gas) and a hydrophilic phase (for example, water). At the interface, the surfactant aligns so that the hydrophobic tail of the surfactant molecule is in the nonpolar gas and the polar head group of the surfactant molecule is in the water. This may cause a decrease in surface or interfacial tensions. The hydrocarbon tail may be, for example, a hydrocarbon, fluorocarbon, or siloxane.

Surfactants may be classified as nonionic, anionic, cationic, or zwitterionic based on the charge of the polar head group. A nonionic surfactant has a polar head group with no charge. Examples of nonionic surfactant include alcohol ethoxylates (AE) including ethoxylated aliphatic alcohols. An anionic surfactant has a polar head group with a negative charge. Examples of anionic surfactant are alkyl sulfates. A cationic surfactant has a polar head group with a positive charge. Examples of cationic surfactant are quaternary ammonium salts. A zwitterionic surfactant has a polar head group with both a positive charge and a negative charge. Examples of zwitterionic surfactant include betaines and amphoacetates.

As indicated, the present techniques may include an oxidizing foam, oxidizing emulsion, oxidizing foamed emulsion, or oxidizing liquid-carrying gas that are utilized as a hydraulic fracturing fluid. The oxidizing foam may be include a gas dispersed in liquid. The oxidizing foam may be a mixture of an inert gas, water, surfactant, and an oxidizer(s). Similarly, the oxidizing liquid-carrying gas may be a mixture of an inert gas, water, surfactant, and an oxidizer(s). The oxidizing liquid-carrying gas may include liquid (water) dispersed in gas (inert gas).

The oxidizing emulsion may include a mixture of two immiscible liquids. The two immiscible liquids may be water and a liquid immiscible with water. The liquid immiscible with water may be, for example, oil or liquid $CO_2$. The oxidizing emulsion may include a mixture of a liquid (e.g., water) and a supercritical fluid (e.g., $CO_2$) that are immiscible.

The oxidizing emulsion may be a mixture of water, fluid (liquid or supercritical fluid) that is immiscible with water, a surfactant, and an oxidizer(s). Examples of the present emulsions may include water dispersed in hydrophobic liquid or supercritical fluid (e.g., water-in-supercritical $CO_2$ microemulsions). Examples of the present emulsions may include hydrophobic liquid dispersed in water.

The hydraulic fracturing fluid as an oxidizing foamed emulsion may include gas (e.g., inert gas) and liquid (generally immiscible with water) both dispersed in water having an inorganic oxidizer. The liquid immiscible with water may be, for example, oil.

The present oxidizing hydraulic-fracturing fluid may break down kerogen in the subterranean formation during the hydraulic fracturing of the subterranean formation while utilizing less water than other hydraulic fracturing fluids. If included in the fracturing fluid, the inert gas, liquid $CO_2$, or supercritical $CO_2$ may increase hydrocarbon recovery as compared to hydraulic fracturing fluids without an inert gas, liquid $CO_2$, or supercritical $CO_2$. In particular, the inert gas, liquid $CO_2$, or supercritical $CO_2$ may promote displacement of hydrocarbons from the subterranean formation including from the kerogen.

Figure 3:
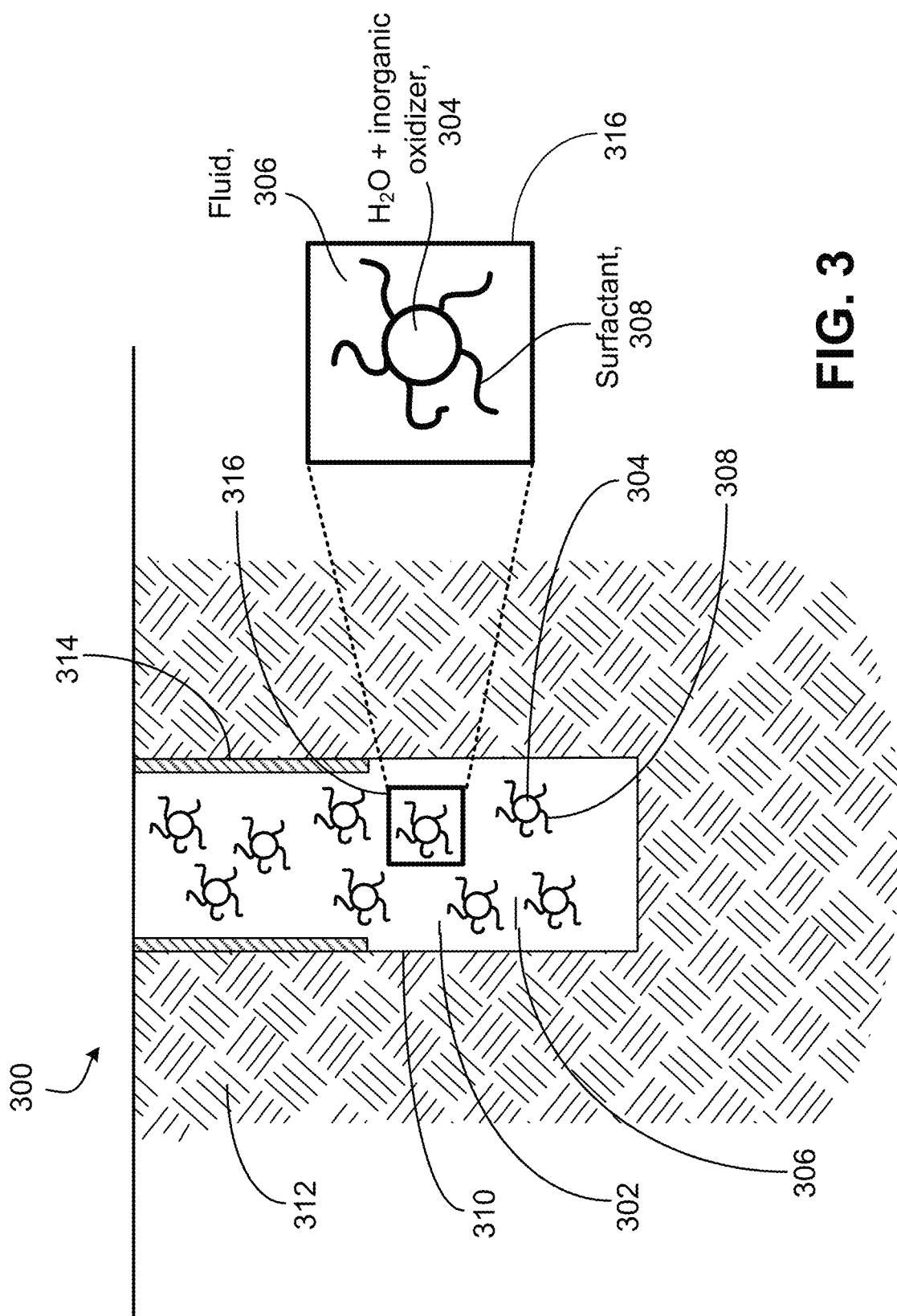
FIG. 3 is a diagram of a well employing a hydraulic fracturing fluid that is an oxidizing fracturing fluid having an internal aqueous phase.

FIG. 3 is a well 300 employing a hydraulic fracturing fluid 302 that is a reactive hydraulic-fracturing fluid having at least one oxidizer. The hydraulic fracturing fluid 302 may be formulated and mixed to give the fracturing fluid 302 as reactive at least because of the oxidizer(s). In embodiments, the hydraulic fracturing fluid 302 includes on a volume basis: (1) water less than 30%, less than 25%, or in the range of 5% to 30%, and which may form an internal aqueous phase 304 (dispersed phase) in the oxidizing fracturing fluid; (2) a fluid (e.g., inert fluid) at least 65% or at least 70%, or in the range of 70% to 90%, and which may form an external phase 306 (continuous phase) in the fracturing fluid; and (3) a surfactant or an amphilic block copolymer (or both) less than 5% or in a range of 0.03% to 5%.

The fluid that is the external phase 306 may generally be immiscible with water. The external phase 306 fluid may be gas, liquid, or supercritical fluid.

The external phase 306 fluid may be liquid (e.g., oil or $CO_2$) or supercritical fluid (e.g., $CO_2$). If so, the hydraulic fracturing fluid 302 may be an emulsion. The oil may be, for example, mineral oil.

The external phase 306 fluid may be an inert gas. If so, the external phase 306 may be an inert-gas carrier phase, and the hydraulic fracturing fluid 302 labeled as a liquid-carrying gas or water-carrying gas in embodiments. The inert gas may be $CO_2$, nitrogen ($N_2$), ethane, propane, butane, or argon, or mixtures of these. The inert gas carries the water. In certain embodiments, the fracturing fluid with the inert gas as the external phase 306 may have characteristics of a mist or aerosol, but in some instances with increased liquid (water) loading in the internal (dispersed) phase 304. In particular embodiments with the external phase 306 as inert gas, the carried or entrained water may be droplets or formed dispersed slugs.

The surfactant 308 may facilitate formation of the fracturing fluid 302 having the external phase 306 (continuous phase) as inert gas, liquid (e.g., oil or $CO_2$), or supercritical fluid (e.g., $CO_2$). In the illustrated embodiment, the external phase 306 may generally be immiscible with water. The surfactant 308 may be an interfacial surfactant (as depicted) in the fracturing fluid 302. The surfactant 308 may be a pseudo-surfactant that is an amphilic block copolymer (also known as amphiphilic block copolymer) that functions as an interfacial surfactant in being amphiphilic with hydrophobic block(s) and hydrophilic block(s).

The water includes the inorganic oxidizer at a concentration, for example, in the range of 10 millimolar (mM) to 200 mM in the water or 10 millimolar (mM) to 150 mM in the water. The inorganic oxidizer may be at least 50 mM in the water. The inorganic oxidizer may be in the internal aqueous phase 304 of the formed fracturing fluid 302. The molar concentration of the inorganic oxidizer based on the amount of overall hydraulic fracturing fluid 302 may be less than 75 mM in some implementations. The inorganic oxidizer may be an alkali salt (which may be an alkaline-earth metal salt) having an anion that may be bromate, chlorate, perchlorate, chlorite hypochlorite, persulfate, iodate, bromite, perborate, dichromate, permanganate, ferrate, percarbonate, nitrite, or nitrate.

In the illustrated embodiment, the hydraulic fracturing fluid 302 is reactive (oxidizing) and includes: (a) the internal aqueous phase 304 including water having the inorganic oxidizer; (b) the interfacial surfactant 308; and (c) the external phase 306 (as the continuous phase) optionally having an oxidizer as a second oxidizer in the fracturing fluid 302.

The second oxidizer (if employed) may be included in the fracturing fluid 302 to reside in the external phase 306. For examples of the external phase 306 as an inert gas, the second oxidizer may be a reactive gas. The reactive gas may include, for example, chlorine dioxide, bromine, ozone, or chlorine. In examples of the external phase 306 as oil or $CO_2$ (liquid $CO_2$ or supercritical $CO_2$), the second oxidizer may be an organic oxidizer.

For the external phase 306 as oil, liquid $CO_2$, or supercritical $CO_2$, the second oxidizer may be an organic oxidizer, such as in having an organic cation. The organic oxidizer with the organic cation may have an inorganic anion as the oxidizer. The second oxidizer may be quaternary ammonium salts of the following anions: bromate, chlorate, perchlorate, chlorite hypochlorite, persulfate, iodate, bromite, perborate, dichromate, permanganate, ferrate, percarbonate, or nitrite. The second oxidizer may be salts of pyridinium, pyrrolidinium, imidazolium, tetraphenylphosphonium, or bis(triphenylphosphine)iminium paired with one of the following anions: bromate, chlorate, perchlorate, chlorite hypochlorite, persulfate, iodate, bromite, perborate, dichromate, permanganate, ferrate, percarbonate, or nitrite.

If the second oxidizer (organic oxidizer or reactive gas) is included, the molality of total oxidizer (inorganic oxidizer plus second oxidizer) in the fracturing fluid 302 may be, for example, in the range of 10 mM to 150 mM. The unit mM for this molality range of total oxidizer is moles of total oxidizer per kilogram of fracturing fluid 310. The total oxidizer may be the combined amount of the inorganic oxidizer (as a first oxidizer) in the water and the second oxidizer in the external phase 306.

A simplified schematic of a wellbore 310 in a subterranean formation 312 is depicted. In the illustrated implementation, the wellbore 310 has a casing 314. Surface equipment includes pump(s) to introduce the fracturing fluid 310 through the wellbore 310 into the subterranean formation 312. For examples of the external gas phase 306 as inert gas (and thus the hydraulic fracturing fluid 310 having a gas content of at least 70 vol %), the pump(s) may be configured for multi-phase flow including with relatively high gas content.

The surfactant 308 (for example, interfacial surfactant) to promote the fracturing fluid 302 having the external continuous phase 306 and internal (dispersed) aqueous phase 304 may be a cationic surfactant, an anionic surfactant, a nonionic surfactant, or a zwitterionic surfactant. This surfactant (for example, the interfacial surfactant 308) to make the emulsion or liquid-carrying gas may be fluorinated as in the following examples: (1) perfluoroether ammonium carboxylate or ammonium carboxylic acid perfluoroether; (2) ($C_7F_{15}CH(OSO_3Na^+)C_7H_{15}$ (a double-tail hybrid fluorocarbon/hydrocarbon surfactant); (3) bis(1H,1H,5H-octafluoro-n-pentyl) sodium sulfosuccinate (di-HCF4); (4) sodium 1-oxo-1-[4-(perfluorohexyl)phenyl]hexane-2-sulfonate, FC6-HC4; (5) 1-oxo-1-[4-(perfluorohexyl)phenyl]hexane (Nohead FC6HC4); (6) sodium 1,5bis[(1H,1H,2H,2H-perfluorobutyl)oxy]-1,5-dioxopentane-2-sulfonate ($2FG(EO)_2$); (7) sodium 1,5-bis[(1H,1H,2H,2H-perfluorohexyl)oxy]-1,5dioxopentane-2-sulfonate ($4FG(EO)_2$); (8) sodium 1,5-bis[(1H,1H,2H,2H-perfluorodecyl)oxy]-1,5-dioxopentane-2-sulfonate ($8FG(EO)_2$); (9) sodium 1,4-bis[(1H,1H,2H,2H-perfluorohexyl)oxy]-1,4dioxobutane-2-sulfonate ($4FS(EO)_2$); and (10) sodium 1,4-bis[(1H,1H,2H,2H-perfluorodecyl)oxy]-1,4-dioxobutane-2-sulfonate ($8FS(EO)_2$). The surfactant (for example, the interfacial surfactant 308) to make the water-in-inert gas foam or emulsion may also be nonfluorinated as in the case of poly(ethylene glycol) 2,6,8-trimethyl-4-nonyl ethers, such as octa(ethylene glycol) 2,6,8-trimethyl-4-nonyl ether (5b-$C_{12}E_8$). The amphilic block-copolymer (functioning as a surfactant 108) can be fluorinated or non-fluorinated as in the case of $F(CF_2CF_2)_{3-8}CH_2CH_2O(CH_2CH_2O)_{10-15}H$ and poly(ethylene oxide)-b-poly(butylene oxide), respectively.

The hydraulic fracturing fluid 302 may include additives, such as a clay inhibitor, buffer, scale inhibitor, flowback enhancer, corrosion inhibitor, or fluid loss agent, or any combinations of these. The water (for example, the water that forms into the internal aqueous phase 304) added to the hydraulic fracturing fluid 302 may have a viscosifier (for example, a polysaccharide) to increase viscosity of the fracturing fluid 302. One example of polysaccharide as a viscosifier is guar or guar gum (also called guaran), which is a galactomannan polysaccharide. The fracturing fluid 302 may have a friction reducer to decrease friction experienced by the fracturing fluid 302 in the pumping of the fracturing fluid through the wellbore into the subterranean formation. The friction reducer may be, for example, an anionic copolymer.

The viscosifier or friction reducer, or both, may be added with the water or separate from the water to the fracturing fluid 302. Once added and mixed with the fracturing fluid, the viscosifier or friction reducer, or both, may reside generally exclusively or predominantly in the internal aqueous phase 304.

Figure 4:
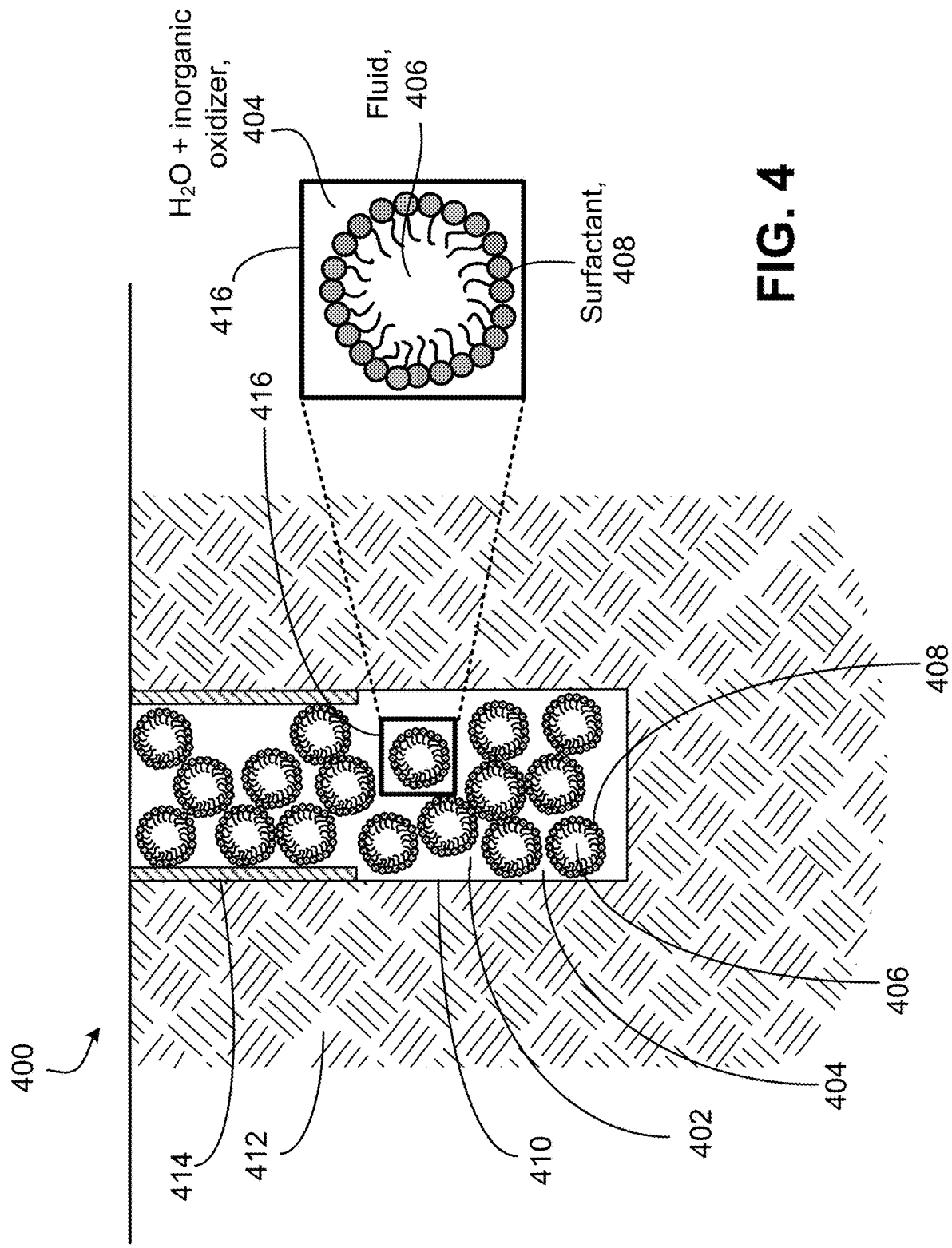
FIG. 4 is a diagram of a well employing a hydraulic fracturing fluid that is an oxidizing fracturing fluid having an external aqueous phase.

FIG. 4 is a well 400 including a hydraulic fracturing fluid 402 that is reactive or oxidizing fracturing fluid. The hydraulic fracturing fluid 402 may be formulated and mixed to give the hydraulic fracturing fluid 402 as the reactive (oxidizing) fracturing fluid. In embodiments, the hydraulic fracturing fluid 402 as formulated includes on a volume basis: (1) water less than 50% or less than 45% or in range of 10% to 45%, and which may form an external aqueous phase 404; (2) a fluid (e.g., inert fluid) greater than 45%, greater than 50%, or greater than 55%, or in a range of 50% to 80% or range of 50% to 90%, and which may form an internal phase 406 in the oxidizing hydraulic fracturing fluid 402; and (3) a surfactant or an amphilic block copolymer (or both) less than 5% or in a range of 0.03% to 5%. The water includes an inorganic oxidizer. Therefore, the external aqueous phase 404 may be characterized as an external aqueous oxidizer phase.

The water includes the inorganic oxidizer at a concentration, for example, in the range of 10 millimolar (mM) to 150 nM in the water (based on the amount of water) in the external aqueous phase 404 of the fracturing fluid 402. The molar concentration (molality) of the inorganic oxidizer based on the amount of overall hydraulic fracturing fluid 402 may be less than 75 mM in some implementations. The inorganic oxidizer may be an alkali salt (including an alkaline-earth metal salt) of the following anions: bromate, chlorate, perchlorate, chlorite hypochlorite, persulfate, iodate, bromite, perborate, dichromate, permanganate, ferrate, percarbonate, nitrite, or nitrate.

Options for the fluid as the internal phase 406 include: (a) inert gas to form the fracturing fluid 402 as foam; (b) oil, liquid $CO_2$, or supercritical $CO_2$ to form the fracturing fluid 402 as an emulsion; or (c) both oil and inert gas to form the fracturing fluid 402 as a foamed emulsion. With respect to the foamed emulsion, the internal phase 406 can be two respective internal phases 406 including an oil phase and an inert-gas phase. For the fracturing fluid 402 as foam or foamed emulsion, the inert gas may be $CO_2$, $N_2$, ethane, propane, butane, or argon, or mixtures of these.

The inert gas in the foam can have a reactive gas as an oxidizer. The oil, liquid $CO_2$, or supercritical $CO_2$ in the emulsion can have an organic oxidizer as an oxidizer in the fracturing fluid 402. As for the foamed emulsion, the oil phase and the inert-gas phase may each have a respective oxidizer. For this foamed emulsion, the oxidizer (if employed) in the oil phase may be an organic oxidizer, and the oxidizer (if employed) in the inert gas may be a reactive gas.

The surfactant (or amphilic block copolymer) in the fracturing fluid 402 may facilitate formation of fracturing fluid 402 as the foam, emulsion, or foamed emulsion, and with the water as the continuous phase. The surfactant (or amphilic block copolymer) may be the interfacial surfactant 408 as depicted in the oxidizing fracturing fluid 402. The surfactant (for example, as the interfacial surfactant 408) may promote formation of the fracturing fluid 402 giving the aqueous continuous phase may be a cationic compound, an anionic compound, a nonionic compound, or a zwitterionic compound. For instance, the surfactant betaines, sulfated or sulfonated alkoxylates, alkyl quarternary amines, alkoxylated linear alcohols, alkyl sulfonates, alkyl aryl sulfonates, or C10-C20 alkyldiphenyl ether sulfonates. The surfactant 408 may be polyethylene glycols, ethers of alkylated phenol, sodium dodecylsulfate, alpha olefin sulfonates (for example, sodium dodecane sulfonate), and trimethyl hexadecyl ammonium bromide. In implementations, the surfactant (which may arrange as the interfacial surfactant 408) may be added to the fracturing fluid 402 in concentrations in the range from about 0.05% to about 2% by weight of the liquid in the fracturing fluid 402. The concentration of the surfactant may be from about 0.5 gallons to about 20 gallons per 1000 gallons of liquid in the fracturing fluid 402.

In the illustrated embodiment, the hydraulic fracturing fluid 402 (oxidizing) includes: (a) the external aqueous phase 404 (as the continuous phase) having an inorganic oxidizer; (b) the internal phase 406 optionally having an oxidizer (e.g., as a second oxidizer in the fracturing fluid 402); and (c) the interfacial surfactant 408. A simplified schematic of a wellbore 410 in a subterranean formation 412 is depicted. In the illustrated implementation, the wellbore 410 has a casing 414.

As indicated, the internal phase 406 may optionally have an oxidizer (e.g., as a second oxidizer of the hydraulic fracturing fluid 402). This second oxidizer (if included) may be incorporated in the fracturing fluid 402 to reside in the internal phase 406.

For examples of hydraulic fracturing fluid 402 as an oxidizing foam with the internal phase 406 including inert gas, the additional oxidizer may be a reactive gas. The reactive gas may be, for example, chlorine dioxide, bromine, ozone, or chlorine. This reactive gas as an oxidizer that may be optionally included in the inert gas in the fracturing fluid 402 may be a second oxidizer of the fracturing fluid 402.

For examples of hydraulic fracturing fluid 402 as an oxidizing emulsion with the internal phase 406 including oil, liquid $CO_2$, or supercritical $CO_2$, the oxidizer in the internal phase 406 as a second oxidizer of the fracturing fluid 402 may be an organic oxidizer. This organic oxidizer may have an organic cation and oxidizing inorganic anion. If so, the oxidizing inorganic anion may be, for example, a bromate ion or a chlorate ion. The organic oxidizer in the internal phase 406 of the emulsion may be quaternary ammonium salts of the following anions: bromate, chlorate, perchlorate, chlorite hypochlorite, persulfate, iodate, bromite, perborate, dichromate, permanganate, ferrate, percarbonate, or nitrite. The organic oxidizer may be salts of pyridinium, pyrrolidinium, imidazolium, imidazolium, tetraphenylphosphonium, or bis(triphenylphosphine)iminium paired with one of the following anions: bromate, chlorate, perchlorate, chlorite hypochlorite, persulfate, iodate, bromite, perborate, dichromate, permanganate, ferrate, percarbonate, or nitrite.

For examples of hydraulic fracturing fluid 402 as an oxidizing foamed emulsion, one or two oxidizers may be included in the two internal phases 404, respectively. The two oxidizers may be a second oxidizer and third oxidizer, respectively, of the fracturing fluid 402. The two oxidizers may be a reactive gas in the inert-gas phase and an organic oxidizer in the oil phase, respectively. As for these oxidizers in addition to the inorganic oxidizer in the water, the foamed emulsion may include one or both of these additional oxidizers in the internal phase 406. For instance, the foamed emulsion may include a reactive gas in the inert gas or an inorganic oxidizer in the oil, or both.

If the second oxidizer is included in the foam, emulsion, or foamed emulsion, or if the second oxidizer and third oxidizer are included in the foamed emulsion, the molality of total oxidizer may be, for example, in the range of 10 mM to 150 mM in which the unit mM here is moles of oxidizer per kilogram of fracturing fluid 402. The total oxidizer may be the combined amount of the inorganic oxidizer (as a first oxidizer of the fracturing fluid) in the water and the second oxidizer (of the fracturing fluid) in the foam, emulsion, or foamed emulsion. In some embodiments of the foamed emulsion, the total oxidizer may be the combined amount of the inorganic oxidizer (as a first oxidizer) in the water, the second oxidizer, and the third oxidizer.

The hydraulic fracturing fluid 402 may include additives, such as a clay inhibitor, buffer, scale inhibitor, flowback enhancer, corrosion inhibitor, or fluid loss agent, or any combinations of these. The water (for example, the water that forms into the external aqueous phase 404) added to the hydraulic fracturing fluid 402 may have a viscosifier (for example, a polysaccharide) or friction reducer. The viscosifier (or friction reducer) may be added with or separate from the water to the fracturing fluid 402. The viscosifier (or friction reducer) may reside in the external aqueous phase 404. One example of polysaccharide as a viscosifier is guar or galactomannan polysaccharide.

Referring to FIGS. 3 and 4, nanoparticles with hydrophobic or hydrophilic properties or with both hydrophobic and hydrophilic domains may be added to the oxidizing fracturing fluid 302, 402 to further stabilize the fracturing fluid 302, 402. Moreover, the type of surfactant 308, 408 utilized (added to the fracturing fluid) may be alternated during pumping of the fracturing fluid to alternate formation of the type of external-phase fracturing fluid. For instance, the type of surfactant may be alternated in examples of the fracturing fluid 302, 402 having an inert gas to alternate the external phase between water 404 and gas 306.

In certain embodiments, the hydraulic fracturing fluid (foam, emulsion, foamed emulsion, or liquid-carrying gas) may be prepared by mixing the inorganic oxidizer and surfactant together in water and optionally with other additives. The other additives may include, for example, viscosifier, crosslinker, clay inhibitor, buffer, scale inhibitor, flowback enhancer, corrosion inhibitors, and fluid loss agents. The addition of the nonpolar fluid (inert gas, oil, liquid $CO_2$, or supercritical $CO_2$) may be added subsequently in another mixing step in some embodiments.

There may be advantages of employing this oxidizing fracturing fluid (with an aqueous inorganic oxidizer and optionally an oxidizer in a nonpolar phase) instead of the water alone as the base fluid or the nonpolar fluid alone as the base fluid. The presence of both water and nonpolar fluid facilitates a variety of oxidizers or blends of oxidizers to be utilized. Some oxidizers are only soluble in water while others are only soluble in organic or nonpolar solvents. Embodiments facilitate various oxidizers (including combinations of oxidizers) to be incorporated in the fracturing fluid. In some instances, blends of oxidizer may be beneficial.

The present hydraulic fracturing fluid may synergistically improve or increase the effectiveness of the oxidizer toward the kerogen. The nonpolar fluid has the potential to displace methane and other light hydrocarbons from the kerogen and rock matrix to increase or improve production. Kerogen may absorb $CO_2$ and other nonpolar fluid but will generally exclude water due to kerogen hydrophobicity. Water alone generally cannot sufficiently flush hydrocarbon (for example, natural gas having economic value) out of the kerogen. The inclusion of both nonpolar solvent (for example, inert gas, oil, liquid $CO_2$, supercritical $CO_2$) and polar solvent (for example, water) in the fracturing fluid may improve or increase penetration of the fracturing fluid into the kerogen (or other organic material) in the subterranean formation in the hydraulic fracturing. Having both types of solvents (water and nonpolar solvent) present may help solubilize the various kerogen breakdown products.

Hydraulic fracturing can be water intensive. Some subterranean formations are adversely sensitive to water due, for example, to clay components in the subterranean formation. Further, treatment of flowback water adds cost. In response, the present oxidizing-fracturing fluid treatment may employ less water than traditional hydraulic fracturing treatment. Reduction of the amount of water utilized for hydraulically fracturing may be beneficial.

In embodiments, the viscosity of the oxidizing fracturing fluid may be less viscous than some conventional fracturing fluids. Therefore, for some implementations, treatment pressures of the hydraulic fracturing can be less due to reduced breakdown pressure. This can reduce cost because the fracturing treatment may be less energy-intensive with less breakdown pressure. Increased fracturing efficiency generally results from decreased breakdown pressure for the subterranean formation being subjected to the fracturing.

Viscosity, surface tension, and other colligative properties of the fracturing fluid may affect the rate at which the fracturing fluid permeates the pores of a formation, which in turn can affect the fracturing efficiency. The reducing of fracturing-fluid viscosity with the present fracturing fluid as compared to traditional fracturing fluids may speed the rate of permeation of the fracturing fluid.

The oxidizing fracturing fluid may be less viscous due to the presence of the nonpolar solvent (e.g., nonpolar gas) in the fracturing fluid (e.g., oxidizing foam or emulsions). The structure (for example, multi-scale, foam structure, or emulsion structure) may contribute to proppant suspension, which can lead to less viscosifier employed to facilitate suspension of proppant in the fracturing fluid. The aqueous fluid (containing the inorganic oxidizer) of the fracturing fluid can be viscosified and then foamed or emulsified to provide fracturing fluid with greater viscosity capable of carrying proppants. In certain embodiments for the present fracturing fluid, crosslinked fluids can be foamed or emulsified containing the oxidizers discussed.

Figure 5:
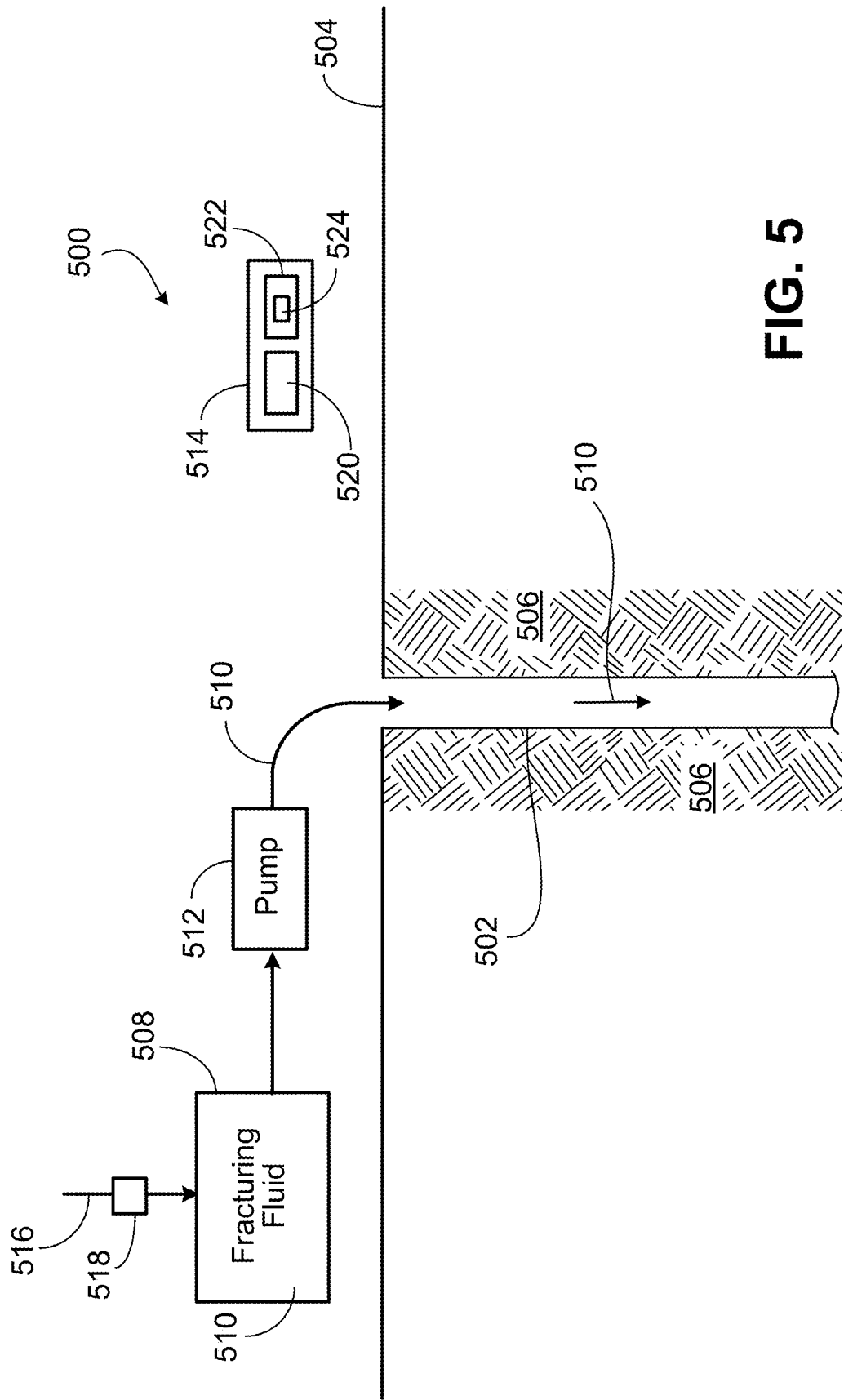
FIG. 5 is a diagram of a well site having a wellbore formed through the Earth surface into a subterranean formation in the Earth crust.

FIG. 5 is a well site 500 having a wellbore 502 formed through the Earth surface 504 into a subterranean formation 506 in the Earth crust. The subterranean formation 906 may be labeled as a geological formation, a rock formation, or a hydrocarbon formation. The subterranean formation 506 may be an unconventional formation to be subjected to hydraulic fracturing.

The wellbore 502 can be vertical, horizontal, or deviated. The wellbore 502 can be openhole but is generally a cased wellbore. The annulus between the casing and the formation 506 may be cemented. Perforations may be formed through the casing and cement into the formation 506. The perforations may allow both for flow of hydraulic fracturing fluid into the subterranean formation 506 and for flow of produced hydrocarbon from the subterranean formation 506 into the wellbore 502.

The well site 500 may have a hydraulic fracturing system including a source 508 of hydraulic fracturing fluid 510 at the Earth surface 504 near or adjacent the wellbore 502. The source 508 may include one or more vessels holding the fracturing fluid 510. The fracturing fluid 510 may be stored in vessels or containers on ground, on a vehicle (for example, truck or trailer), or skid-mounted. The fracturing fluid 510 may be a water-based fracturing fluid. In some implementations, the fracturing fluid 510 is slickwater that may be primarily water (for example, at least 98.5% water by volume). The fracturing fluid 510 can be prepared from seawater. The fracturing fluid 510 can also be gel-based fluids. The fracturing fluid 510 can include polymers and surfactants. The fracturing fluid 510 can be a viscoelastic surfactant (VES)-based fluid including a reactive VES-based fracturing fluid having an inorganic oxidizer salt. Additives to the fracturing fluid 510 may include hydrochloric acid, friction reducer, emulsion breaker, emulsifier, temperature stabilizer, and crosslinker. Fracturing fluids 510 of differing viscosity may be employed in the hydraulic fracturing. The fracturing fluid 510 may include proppant. In the illustrated embodiment, the fracturing fluid 510 is an oxidizing fracturing fluid (for example, fracturing fluid 302 or 404) for at least a portion of the hydraulic fracturing. This oxidizing fracturing fluid 510 may be foam, emulsion, foamed emulsion, or liquid-carrying gas.

The hydraulic fracturing system at the well site 500 may include motive devices such as one or more pumps 512 to pump (inject) the fracturing fluid 510 through the wellbore 502 into the subterranean formation 506. The pumps 512 may be, for example, positive displacement pumps and arranged in series or parallel. The wellbore 502 may be a cemented cased wellbore and have perforations for the fracturing fluid 510 to flow (injected) into the formation 506. In some implementations, the speed of the pumps 510 may be controlled to give desired flow rate of the fracturing fluid 510. The system may include a control component to modulate or maintain the flow of fracturing fluid 510 into the wellbore 502 for the hydraulic fracturing. The control component may be, for example, a control valve(s). In some implementations, as indicated, the control component may be the pump(s) 512 as a metering pump in which speed of the pump 512 is controlled to give the desired or specified flow rate of the fracturing fluid 510. The set point of the control component may be manually set or driven by a control system, such as the control system 514.

The hydraulic fracturing fluid 510 may be prepared (formulated and mixed) offsite prior to disposition of the fracturing fluid 510 into the source 508 vessel at the well site 500. Alternatively, a portion (some components) of the fracturing fluid 510 may be mixed offsite and disposed into the source 508 vessel and the remaining portion (remaining components) of the fracturing fluid 510 added to the source 508 vessel or to a conduit conveying the fracturing fluid 510. In other implementations, the fracturing fluid 510 may be prepared onsite with components added to (and batch mixed in) the source 508 vessel.

For embodiments of the fracturing fluid 510 as an oxidizing fracturing fluid, the fracturing fluid 510 in the source 508 vessel may have all components of the fracturing fluid 510. In certain embodiments, some components of the fracturing fluid 510 may be added to the source 508 vessel near or at the time (or during) the pumping of the fracturing fluid 510 into the wellbore 502 for the hydraulic fracturing. In some embodiments, not all components of the fracturing fluid 510 are included in the source 508 vessel. Instead, at least one component of the fracturing fluid 510 is added to a conduit conveying the fracturing fluid 510 either on the suction side of the pump(s) 512 or on the discharge side of the pump(s) 512, or both, as the fracturing fluid 510 is being pumped into the wellbore 502.

An additive or component 516 may be added to the fracturing fluid 508. For the oxidizing fracturing fluid, the component 516 may be, for example, the first oxidizer, the second oxidizer, the third oxidizer, surfactant, or a viscosifier. The concentration of the component 516 in the fracturing fluid 510 may be maintained or adjusted by modulating a flow rate (mass or volume) of addition of the component 516 via a control device 518. The set point of the control device 518 may be manually set or specified (directed) by the control system 514. The control device 518 may be a control valve on the conduit conveying the component 516 to the source 508 (for example, vessel) of the fracturing fluid 510. In some implementations, the component 516 may in an aqueous solution added to the fracturing fluid 510 in the source 508 vessel. Further, instead of adding the component 516 to the source 508 vessel, the component 516 may be added to the discharge conduit of the pump 512 as the pump 512 is providing the fracturing fluid 510 into the wellbore 502.

The hydraulic fracturing system at the well site 500 may have a source of proppant, which can include railcars, hoppers, containers, or bins having the proppant. Proppant may be segregated by type or mesh size (particle size). The proppant can be, for example, sand or ceramic proppants. The source of proppant may be at the Earth surface 504 near or adjacent the wellbore 502. The proppant may be added to the fracturing fluid 510 such that the fracturing fluid 510 includes the proppant. In some implementations, the proppant may be added (for example, via gravity) to a conduit conveying the frac fluid 510, such as at a suction of a fracturing fluid pump 512. A feeder or blender may receive proppant from the proppant source and discharge the proppant into pump 512 suction conduit conveying the fracturing fluid 510.

The fracturing fluid 510 may be a foamed and/or emulsified slurry having the solid proppant. The slurry may be a water-carrying inert gas having proppant. The pump 512 discharge flow rates (frac rates) may include a slurry rate which may be a flow rate of the fracturing fluid 510 having proppant as a foamed slurry, emulsion slurry, foamed emulsion slurry or water-carrying inert gas slurry. The pump 512 discharge flow rates (frac rates) may include a clean rate which is a flow rate of fracturing fluid 510 without proppant. In particular implementations, the fracturing system parameters adjusted may include at least pump(s) 512 rate, proppant concentration in the frac fluid 510, component 516 addition rate, and component 516 concentration in the fracturing fluid 510. Fracturing operations can be manual or guided with controllers.

The well site 500 may include a control system 514 that supports or is a component of the hydraulic fracturing system. The control system 514 includes a processor 520 and memory 522 storing code 524 (logic, instructions) executed by the processor 520 to perform calculations and direct operations at the well site 500. The processor 520 may be one or more processors and each processor may have one or more cores. The hardware processor(s) 520 may include a microprocessor, a central processing unit (CPU), a graphic processing unit (GPU), a controller card, or other circuitry. The memory may include volatile memory (for example, cache and random access memory (RAM)), nonvolatile memory (for example, hard drive, solid-state drive, and read-only memory (ROM)), and firmware. The control system 514 may include a desktop computer, laptop computer, computer server, programmable logic controller (PLC), distributed computing system (DSC), controllers, actuators, or control cards. In operation, the control system 514 may facilitate processes at the well site 500 and including to direct operation of aspects of the hydraulic fracturing system.

The control system 514 may be communicatively coupled to a remote computing system that performs calculations and provides direction. The control system 514 may receive user input or remote-computer input that specifies the set points of the control device 518 or other control components in the hydraulic fracturing system. The control system 514 may specify the set point of the control device 518 for the component 516 addition. In some implementations, the control system 514 may calculate or otherwise determine the set point of the control device 518. The determination may be based at least in part on the operating conditions of the hydraulic fracturing and in certain instances on information (or feedback) regarding the amount of kerogen in the region of the subterranean formation 506 being hydraulically fractured.

The fracturing fluid containing oxidative materials may be applied (pumped) without other hydraulic fracturing fluids employed in the hydraulic fracturing. In other words, the oxidizing fracturing fluid may be pumped as a stand-alone hydraulic fracturing treatment to fracture the formation and in some cases to transport proppant. However, the oxidizing fracturing fluid may also be applied (pumped) in tandem (in a sequence) with other fluids including other hydraulic fracturing fluids.

For instance, the oxidizing fracturing fluid and proppant may be pumped alternately with the oxidizing fracturing fluid without proppant as a hybrid treatment. The oxidizing fracturing fluid may also be pumped as part of a high conductivity channel frac (a channel fracturing operation). Channel fracturing may refer to hydraulic fracturing treatment employing intermittent pumping of proppant-laden fluid and proppant-free fluid to generate conductive channels within the subterranean formation.

In another instance, the present oxidizing fracturing fluid may be pumped in sequence with a VES-based fracturing fluid as the alternate fracturing fluid. The VES fracturing fluid is provided through the wellbore into the subterranean formation to hydraulically fracture the subterranean formation to form hydraulic fractures in the subterranean formation. In implementations, the VES fracturing fluid may be a reactive VES fracturing fluid. The VES fracturing fluid for hydraulic fracturing the subterranean formation may include an inorganic oxidizer salt in addition to the viscoelastic surfactant. If implemented, the method includes oxidizing organic material in the hydraulic fractures with the reactive VES fracturing fluid.

The present oxidizing fracturing fluid (e.g., oxidizing foam, oxidizing emulsion, oxidizing foamed emulsion, or a liquid-carrying gas that is oxidizing) may be pumped alternatively with $CO_2$-based fluids. A benefit of employing a $CO_2$-based fracturing fluid in tandem with the present oxidizing fracturing fluid is that $CO_2$ slugs can promote expulsion of hydrocarbons from the formation. Further, $CO_2$-based fracturing fluid may include an oxidizer to break down organic material (kerogen) in the formation. $CO_2$ slugs may enhance delivery of oxidizer to the kerogen. The oxidizer in the $CO_2$-based fluid may be an oxidizer that is soluble in organic solutions or nonpolar media (solvents) because the $CO_2$-based fracturing fluid may generally be nonpolar. These oxidizers in the alternate $CO_2$-based fluid may include an organic cation and an oxidizer inorganic anion. The oxidizer inorganic anion may be, for example, chlorate or bromate. Other oxidizer inorganic anions of the oxidizer in the $CO_2$-based fracturing fluid may include persulfate, perborate, percarbonate, hypochlorite, peroxide, or iodate.

Another implementation of a $CO_2$-based fracturing fluid that may be sequenced with the present oxidizing fracturing fluid is supercritical $CO_2$ fracturing fluid. This alternate supercritical $CO_2$ fracturing-fluid may have reactive oxidizer gases (for example, bromine, chlorine, chlorine dioxide, or ozone) for the treatment of kerogen-containing rocks to enhance hydraulic fracturing efficiency of unconventional source rock formations. The reactive oxidizer gases (whether included in the sequenced supercritical $CO_2$ or in the inert gas of the present oxidizing fracturing fluid, or both) may chemically degrade kerogen to enhance rock fracability and clean fracture faces to increase permeability and decrease proppant embedment. The reactive gases may be suited for sequenced $CO_2$-based fracturing fluids (and for the inert-gas phase in embodiments of the present fracturing fluid) because unlike conventional oxidizers, the reactive oxidizer gases here are generally soluble in nonpolar solvents. The oxidizing gas as molecules may exist as a gas or supercritical fluid (at conditions in the subterranean formation) that is soluble in supercritical $CO_2$ and has a standard redox potential in excess of 1 volt. Subterranean formation conditions may be, for example, temperature greater than 200° F. and pressure greater than 3000 pounds per square inch gauge (psig). These reactive gases if employed in the sequenced supercritical $CO_2$ or in the present oxidizing fracturing fluid include, for example, bromine ($Br_2$), chlorine ($Cl_2$), fluorine ($F_2$), chlorine monofluoride (ClF), chlorine dioxide ($ClO_2$), oxygen ($O_2$), ozone ($O_3$), nitrous oxide ($N_2O$), or nitrite ($NO_2$) gases.

Reactive gases may also be generated in situ upon injection of precursors with $CO_2$ into the formation. In such an implementation for a sequenced $CO_2$-based fracturing fluid, the technique may involve mixing of supercritical $CO_2$ with an oxidizing gas stream. These oxidizing gas chemicals can be mixed on-the-fly with liquid $CO_2$ and surfactant to form the sequenced supercritical $CO_2$ emulsion and pumped. The oxidant (oxidizer) should be consumed downhole and therefore may beneficially preclude flowback treatment or disposal. If the oxidant is prepared in situ for the sequenced supercritical $CO_2$, the precursors may be injected with supercritical $CO_2$. For example: (1) the first precursor with $CO_2$ is injected, (2) a $CO_2$ spacer is then pumped, and (3) the second precursor with $CO_2$ is then injected. This order may prevent or reduce premature reaction of the precursors to form the reactive gas.

For bromine as the reactive gas (for the sequenced $CO_2$ or the present fracturing fluid, or both), the bromine reacts with the kerogen and pyrite. The bromine may partially depolymerize the kerogen (a geopolymer). This reaction of bromine with kerogen may form light-chain products that escape when the $CO_2$ or inert gas is vented. This reaction of bromine with kerogen may also form a brominated kerogen tar at least partially soluble in $CO_2$. This kerogen tar may be soluble in hydrocarbons and therefore leave the rock matrix migrating from the formation to the wellbore.

As for supply of $ClO_2$ as an oxidizer in the supercritical $CO_2$ or in the inert gas of embodiments of the above-discussed oxidizing fracturing fluid, $ClO_2$ generators commercially available may be deployed at the well site. The $ClO_2$ gas can be mixed with the liquid $CO_2$ or oxidizing on-the-fly for the stimulation and treatment of organic-rich shale formation for enhanced hydrocarbon production. The $ClO_2$ gas generally does not hydrolyze when entering water and remains a dissolved gas in solution. The $ClO_2$ gas may be up to 10 times more soluble in water than is chlorine and therefore a greater dose (compared to chlorine) of the oxidizer gas $ClO_2$ can be delivered to the formation. In lieu of relying on $ClO_2$ generators, the $ClO_2$ gas may instead be generated in situ (downhole in the wellbore) via, for example, utilizing sodium chlorite. Over time, produced $ClO_2$ gas may help degrade the kerogen and increase production. If $ClO_2$ is the oxidant (oxidizer), $ClO_2$ may be prepared on site and utilized as a mixture with air.

Lastly, other $CO_2$-based hydraulic fracturing fluids may be employed in tandem with the present oxidizing fracturing fluid. For example, $CO_2$-based fluids with an oxidizer containing in-situ forming halogens may be employed. Implementations of generating halogen in situ may include, for example: (1) delivery of encapsulated salts of polyhalogen anions, which decompose at reservoir temperatures to yield the free halogen; (2) generation of bromine, chlorine, and/or iodine by reaction of encapsulated $[XO_3]^-$ (X=Cl, Br, I) with encapsulated acids to yield unstable $HXO_3$, which rapidly decomposes to $X_2$; (3) generation of bromine, chlorine, and/or iodine by reduction of encapsulated $[XO_3]^-$ (X=Cl, Br, I) to form $X_2$; and (4) use of N-bromosuccinimide, N-chlorosuccinimide, or N-iodosuccinimide as halogenating agents, giving the effect of the free halogen while avoiding environmental concerns.

Figure 6:
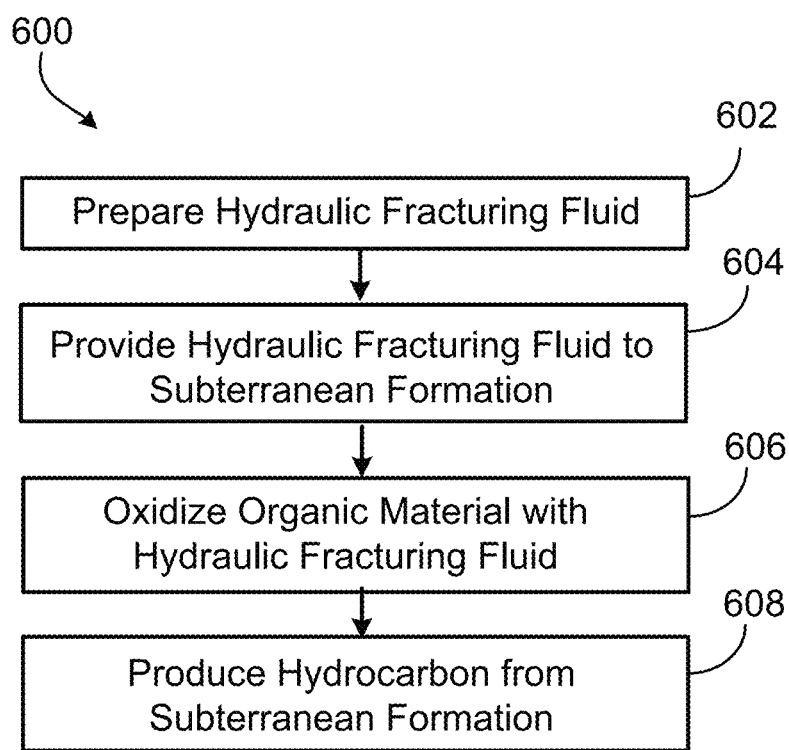
FIG. 6 is a method of hydraulic fracturing a subterranean formation having organic material.

FIG. 6 is a method 600 of hydraulically fracturing a subterranean formation. The subterranean formation includes organic material, such as kerogen. A wellbore (formed in the subterranean formation) provides access to the subterranean formation.

At block 602, the method includes preparing a hydraulic fracturing fluid having water and a fluid (e.g., non-aqueous phase or nonpolar phase) generally immiscible with water. The water may be an aqueous phase or polar phase. The fluid may be a non-aqueous phase or a nonpolar phase. The fluid may be a hydrophobic liquid or nonpolar solvent (for example, oil, liquid $CO_2$, supercritical $CO_2$, etc.) or an inert gas (for example, nonpolar inert gas). The inert gas may be, for example, $CO_2$, $N_2$, ethane, propane, butane, or argon, or mixtures thereof. In implementations, the fluid (e.g., non-aqueous phase) is at least 50 vol % of the hydraulic fracturing fluid and the water is less than 50 vol % of the hydraulic fracturing fluid. In other implementations, the fluid (e.g., non-aqueous phase) is at least 70 vol % of the hydraulic fracturing fluid and the water is less than 30 vol % of the hydraulic fracturing fluid.

The hydraulic fracturing fluid may be prepared as a foam, emulsion, foamed emulsion, or liquid-carrying gas. A surfactant may be incorporated into the formulation to promote (as an interfacial surfactant) the forming of the hydraulic fracturing fluid as a foam, emulsion, foamed emulsion, or liquid-carrying gas. The surfactant may be, for example, less than 5 vol % of the hydraulic fracturing fluid.

An inorganic oxidizer is incorporated into the hydraulic fracturing fluid. Thus, the hydraulic fracturing fluid is an oxidizing fracturing fluid. The concentration of the inorganic oxidizer in the water in the hydraulic fracturing fluid may be, for example, in the range of 10 mM to 200 mM or in the range of 10 mM to 150 mM. In certain implementations, the inorganic oxidizer has an anion that is bromate, chlorate, perchlorate, chlorite hypochlorite, persulfate, iodate, bromite, perborate, dichromate, permanganate, ferrate, percarbonate, nitrite, or nitrate.

The surfactant and mixing of the hydraulic fracturing fluid may give generation of the oxidizing fracturing fluid having at least two phases. One phase can be an aqueous phase having the water and the inorganic oxidizer. The other phase can be a nonpolar phase or non-aqueous phase (e.g., inert gas, nonpolar fluid, nonpolar solvent, oil, liquid $CO_2$, supercritical $CO_2$, etc.). The oxidizing fracturing fluid may be prepared with the aqueous phase as a continuous external phase and the non-aqueous phase as not a continuous phase but instead an internal phase of the hydraulic fracturing fluid. On the other hand, the oxidizing fracturing fluid may be prepared with the non-aqueous phase as a continuous external phase (a carrier phase) and the aqueous phase as not a continuous phase but instead an internal phase of the hydraulic fracturing fluid. Whether the continuous phase is aqueous or non-aqueous may depend on the particular surfactant (or type of surfactant) utilized. Other factors contributing to whether the continuous phase is aqueous or non-aqueous may include, for example, the relative amounts of water and non-aqueous fluid in the hydraulic fracturing fluid.

In some implementations, the preparing of the hydraulic fracturing fluid includes mixing the water, the surfactant, and the inorganic oxidizer to give a first mixture. The mixing may be performed in a vessel. One or more additives (for example, viscosifier) may also be included in the forming (mixing) that gives the first mixture. Then, a non-aqueous fluid (e.g., inert gas or non-polar solvent) is added (injected) and mixed with the first mixture to give the hydraulic fracturing fluid. This subsequent addition may be performed in the same vessel or a different vessel. The injection of the non-aqueous fluid (for example, at a given velocity) may promote mixing of the non-aqueous fluid with the first mixture. Mixing may also be implemented by a mechanical rotating agitator, such as an impeller, turbine, propeller, or paddle. While vessel(s) may be utilized, a component(s) may be added online (on-the-fly), such as to a conduit conveying the fracturing fluid.

In certain implementations, a reactive gas as an optional oxidizer is added to the inert gas (if employed) as the non-aqueous fluid prior to addition or injection of the inert gas or is added directly to the hydraulic fracturing fluid. Thus, the non-aqueous phase (for example, nonpolar gas phase) in embodiments of the oxidizing fracturing fluid may include the inert gas and also a reactive gas as an oxidizer. In a particular implementation with chlorine dioxide ($ClO_2$) as the reactive gas, a $ClO_2$ generator deployed at the well site supplies the $ClO_2$ for addition in forming the hydraulic fracturing fluid.

In other implementations with the non-aqueous fluid as oil, liquid $CO_2$, or supercritical $CO_2$, then an oxidizer compound (for example, a salt) having an organic cation and an inorganic oxidizer anion may be optionally incorporated to reside in the non-aqueous phase formed in the oxidizing fracturing fluid.

The preparation of the oxidizing hydraulic fracturing fluid may include adding proppant to the hydraulic fracturing fluid (e.g., foam, emulsion, foamed emulsion, or liquid-carrying gas). The oxidizing fracturing fluid may include the proppant for at least a portion of time the oxidizing fracturing fluid is utilized in the hydraulic fracturing of the subterranean formation.

At block 604, the method includes providing (for example, pumping) the hydraulic fracturing fluid through the wellbore into the subterranean formation to hydraulically fracture the subterranean formation. The hydraulic fracturing generates hydraulic fractures in the subterranean formation. The pump(s) (if employed) may be, for example, a positive displacement pump.

The method optionally includes alternating or sequencing the oxidizing hydraulic fracturing fluid with another hydraulic fracturing fluid. For instance, the method may include providing (pumping) a slickwater fracturing fluid through the wellbore into the subterranean formation before (and after) providing the oxidizing fracturing fluid through the wellbore into the subterranean formation. The slickwater fracturing fluid may also include an oxidizer. The method may include pumping a slickwater fracturing fluid through the wellbore into the subterranean formation in sequence with the pumping of the present oxidizing fracturing fluid, where the oxidizing fracturing fluid has proppant.

The method may include alternating providing a $CO_2$-based fracturing fluid through the wellbore into the subterranean formation with the providing of the present oxidizing fracturing fluid through the wellbore into the subterranean formation. The $CO_2$-based fracturing fluid may also have an oxidizer to oxidize the organic material in the region of the subterranean formation being subjected to hydraulic fracturing and including in the hydraulic fractures.

At block 606, the method includes oxidizing the organic material (for example, including kerogen) in the subterranean formation with the hydraulic fracturing fluid, such as in the forming hydraulic fractures. The oxidizing may be, for example, via the inorganic oxidizer in the water of the fracturing fluid. The oxidizing of the organic material may degrade or fragment the organic material. Organic material at fracture faces of the hydraulic fractures may be fragmented via the oxidation to create permeable channels through the organic material from the subterranean formation into the hydraulic fractures. Therefore, conductivity of hydrocarbon flow (during subsequent production) from the subterranean into the hydraulic fractures and through the wellbore to the Earth surface may be increased.

At block 608, the method may further include in addition to hydraulic fracturing, the production of hydrocarbon from the subterranean formation. The method may include producing hydrocarbon from the subterranean formation through the permeable channels (for example, block 606) and hydraulic fractures generated to the wellbore.

Lastly, additional discussion in provided with respect to block 602 in the preparing of the hydraulic fracturing fluid. A variation may involve adding or injecting the non-aqueous fluid into the water to give a first mixture and mixing the surfactant and the inorganic oxidizer with the first mixture to give the hydraulic fracturing fluid. Another variation is mixing the surfactant with the water to give a first mixture, injecting the non-aqueous fluid into the first mixture to give a second mixture, and mixing the inorganic oxidizer with the second mixture to give the hydraulic fracturing fluid. Yet another variation is mixing the inorganic oxidizer with the water to give a first mixture, adding or injecting the non-aqueous fluid into the first mixture to give a second mixture, and mixing the surfactant with the second mixture to give the hydraulic fracturing fluid.

The preparing of the hydraulic fracturing fluid may include specifying a concentration of the optional oxidizer (for example, salt or reactive gas) in the non-aqueous phase or in the oxidizing fracturing fluid based at least in part on an amount of kerogen in the subterranean formation. Likewise, the preparing of the hydraulic fracturing fluid may include specifying a concentration of the first oxidizer (inorganic oxidizer) in the water or in the oxidizing fracturing fluid based at least in part on an amount of kerogen in the subterranean formation. The concentration of the oxidizers in the oxidizing fracturing fluid can depend on the quantity of kerogen or other organic matter in the reservoir rock in the subterranean formation, such as in the region of the subterranean formation being subjected to hydraulic fracturing with the oxidizing fracturing fluid. The concentration of the inorganic oxidizer in the water in the oxidizing fracturing fluid to implement can be determined (specified) based on the particular inorganic oxidizer selected and on the amount and type of kerogen in the subterranean formation. Similarly, the concentration of oxidizer (if present) in the non-aqueous phase in the oxidizing fracturing fluid to implement can be determined (specified) based on the particular oxidizer selected and on the amount and type of kerogen in the subterranean formation. Source-rock samples collected from the subterranean formation being hydraulically fractured or to be hydraulically fractured can be collected and analyzed. Laboratory tests (for instance, including etching) can be performed on kerogen embedded in rock surfaces of the samples. Further, the weight percent of the total organic carbon (TOC) in the formation can be determined, for example, via a TOC analyzer or pyrolysis unit. The amount of kerogen in the subterranean region of the subterranean formation to be hydraulically fractured can be calculated, determined, or estimated.

The amount of pyrite or other iron sulfides in the subterranean formation may also be considered in specifying the concentration of the inorganic oxidizer in the water in the oxidizing fracturing fluid and in specifying the concentration of the oxidizer (if employed) in the non-aqueous phase of the oxidizing fracturing fluid. The weight percent of iron sulfide in the formation can be determined, for example, by testing the source-rock samples employing x-ray fluorescence, x-ray diffraction, or energy dispersive x-ray spectroscopy. The amount of kerogen or iron sulfide can also be taken, deduced, or inferred from well logs in certain instances. The determining or specifying the inorganic oxidizer concentration can account for the amount of inorganic oxidizer (or other oxidizer) beneficial to degrade the organic material including kerogen while also accounting for the iron sulfide present in the formation.

The rock surface area within the fracture network that the oxidizing will make contact in the formation can be considered with respect to specifying concentration of the inorganic oxidizer (or other oxidizer) in the oxidizing fracturing fluid. The expected size of the fracture network and the resulting surface area of the fractured zones can be estimated. Other factors relevant in determining or calculating the amount (concentration) of inorganic oxidizer or other oxidizer to specify in the oxidizing fracturing fluid may include any organic components in the fluid downhole and the amount of fluid downhole (including in the wellbore) at the time of placing the oxidizing fracturing fluid through the wellbore into the subterranean formation.

As for surfactant, the addition of the surfactant may generally involve incorporating the surfactant as a component of the hydraulic fracturing fluid before providing or pumping the hydraulic fracturing fluid through the wellbore to the subterranean formation. However, the surfactant may be added to the hydraulic fracturing fluid during the pumping of the hydraulic fracturing fluid. For example, surfactant may be added to a vessel at the well site upstream of the pump. In another instance, the surfactant may be added to a conduit on the suction side of the pump(s) or to a conduit on a discharge side of the pump(s). A reason for such on-the-fly addition may be to alternate the particular surfactant or surfactant type added to the fracturing fluid. The preparing or application of the hydraulic fracturing fluid may involve alternating between adding a first surfactant to the hydraulic fracturing fluid and adding a second surfactant to the hydraulic fracturing fluid. The first surfactant gives the non-aqueous phase as a continuous phase of the oxidizing fracturing fluid and with the aqueous phase as not a continuous phase of the oxidizing fracturing fluid. The second surfactant gives the aqueous phase as a continuous phase of the oxidizing fracturing fluid and with the non-aqueous phase as not a continuous phase of the oxidizing fracturing fluid.

An embodiment is a method of hydraulic fracturing. The method includes providing a hydraulic fracturing fluid through a wellbore into a subterranean formation. The hydraulic fracturing fluid includes water, a nonpolar fluid, and a surfactant. The hydraulic fracturing fluid includes an inorganic oxidizer in the water. The concentration of the inorganic oxidizer in the water may be in a range of 10 mM to 200 mM, and wherein the inorganic oxidizer may have an anion that is bromate, chlorate, perchlorate, chlorite hypochlorite, persulfate, iodate, bromite, perborate, dichromate, permanganate, ferrate, percarbonate, nitrite, or nitrate. The method includes hydraulically fracturing the subterranean formation with the hydraulic fracturing fluid. The method includes oxidizing organic material in the subterranean formation with the hydraulic fracturing fluid. In some examples, the nonpolar fluid may be an inert gas. If so, the hydraulic fracturing fluid may include foam or a liquid-carrying gas. A reactive gas that is an oxidizer may be included in the inert gas. The foam generally has the water as an external phase and the inert gas as an internal phase. The hydraulic fracturing fluid may be a liquid-carrying gas with the inert gas as a continuous phase and the water as a dispersed phase. In certain examples, the nonpolar fluid may be oil, liquid carbon dioxide, or supercritical carbon dioxide. If so, the hydraulic fracturing fluid may include an emulsion of the water with the oil, the liquid carbon dioxide, or the supercritical carbon dioxide. An organic oxidizer may be included in the nonpolar fluid. In implementations, the organic oxidizer (if utilized) may have an organic cation and an inorganic anion. The concentration of the surfactant in the hydraulic fracturing fluid ma be less than 5 volume percent (vol %) in certain implementations. The surfactant may be an interfacial surfactant that promotes the hydraulic fracturing fluid having at least two phases, and wherein the two phases are an aqueous phase and a nonpolar phase, respectively. In implementations, the hydraulic fracturing fluid has an aqueous phase and a nonpolar phase. The nonpolar phase may an external phase in the hydraulic fracturing fluid, and the aqueous phase may be an internal phase in the fracturing fluid. On the other hand, the aqueous phase may be an external phase in the hydraulic fracturing fluid, and the nonpolar phase is an internal phase in the fracturing fluid. In some implementations, the nonpolar fluid is at least 50 vol % of the hydraulic fracturing fluid, wherein the water is less than 50 vol % of the hydraulic fracturing fluid, wherein the hydraulic fracturing fluid has an aqueous phase and a non-aqueous phase, wherein the aqueous phase includes the water and is a continuous phase of the hydraulic fracturing fluid, and wherein the non-aqueous phase includes the nonpolar fluid and is not a continuous phase of the hydraulic fracturing fluid. In certain implementations, the nonpolar fluid is at least 70 vol % of the hydraulic fracturing fluid, wherein the water is less than 30 vol % of the hydraulic fracturing fluid, wherein the hydraulic fracturing fluid has an aqueous phase and a non-aqueous phase, wherein the non-aqueous phase includes the nonpolar fluid and is a continuous phase of the hydraulic fracturing fluid, and wherein the aqueous phase includes the water and is not a continuous phase of the hydraulic fracturing fluid. In particular implementations, the may include preparing the hydraulic fracturing fluid, wherein the preparing involves mixing the water, the surfactant, and the inorganic oxidizer to give a first mixture, and injecting the nonpolar fluid into the first mixture, wherein the nonpolar fluid includes an inert gas. In these particular implementations, the method may involve adding a reactive gas that is an oxidizer to the inert gas, and wherein mixing the water, the surfactant, and the inorganic oxidizer includes mixing the water, the surfactant, the inorganic oxidizer, and an additive to give the first mixture.

Another embodiment is a method of hydraulic fracturing. The method includes providing a hydraulic fracturing fluid through a wellbore into a subterranean formation. The hydraulic fracturing fluid includes an aqueous phase and a non-aqueous phase. The aqueous phase includes water and an inorganic oxidizer in the water. In implementations, the non-aqueous phase may be at least 45 vol % of the hydraulic fracturing fluid. The method includes hydraulically fracturing the subterranean formation with the hydraulic fracturing fluid. The method includes oxidizing organic material in the subterranean formation with the hydraulic fracturing fluid. The oxidizing of the organic material degrades the organic material. The organic material includes kerogen. The method may include specifying a concentration of the inorganic oxidizer in the water or in the hydraulic fracturing fluid based at least in part on an amount of kerogen in the subterranean formation, wherein a molality of the inorganic oxidizer in the water is in a range of 10 millimolar (mM) to 200 nM, and wherein the inorganic oxidizer includes an anion that is bromate, chlorate, perchlorate, chlorite hypochlorite, persulfate, iodate, bromite, perborate, dichromate, permanganate, ferrate, percarbonate, nitrite, or nitrate.

The non-aqueous phase may be an external phase of the hydraulic fracturing fluid, and the aqueous phase an internal phase of the hydraulic fracturing fluid. On the other hand, the non-aqueous phase may be an internal phase of the hydraulic fracturing fluid, and the aqueous phase an external phase of the hydraulic fracturing fluid, and wherein the fracturing fluid includes a foam, an emulsion, or a foamed emulsion. In implementations, the non-aqueous phase may include an inert gas, such as inert gas comprises carbon dioxide ($CO_2$), nitrogen ($N_2$), ethane, propane, butane, or argon, or mixtures thereof. If so, the hydraulic fracturing fluid may include a foam, wherein the non-aqueous phase is an internal phase of the hydraulic fracturing fluid, and wherein the concentration of the water in the hydraulic fracturing fluid is less than 50 vol %. In implementations, the non-aqueous phase is an external phase of the hydraulic fracturing fluid, wherein the aqueous phase is an internal phase of the hydraulic fracturing fluid, and wherein the concentration of the water in the hydraulic fracturing fluid is less than 30 vol %. In particular implementations, the non-aqueous phase may have a reactive gas that is an oxidizer. In one implementation, the method includes: adding chlorine dioxide ($ClO_2$) to the hydraulic fracturing fluid from a $ClO_2$ generator deployed at a well site of the wellbore; and incorporating at least a majority of the $ClO_2$ into the non-aqueous phase as a reactive gas that is an oxidizer. The hydraulic fracturing fluid may include an emulsion, and wherein the non-aqueous phase includes oil, liquid $CO_2$, or supercritical $CO_2$. If so, the non-aqueous phase may have an organic oxidizer having an organic cation and an oxidizing inorganic anion. In examples, the hydraulic fracturing fluid may include a foamed emulsion, wherein the aqueous phase is an external phase of the hydraulic fracturing fluid, wherein the non-aqueous phase includes a first non-aqueous phase and a second non-aqueous phase that are internal phases of the hydraulic fracturing fluid, the first non-aqueous phase including an inert gas and the second non-aqueous phase including a nonpolar fluid (e.g., oil). The first non-aqueous phase may have a reactive gas as an oxidizer. The second non-aqueous phase may have an organic oxidizer.

The method may include adding proppant to the hydraulic fracturing fluid, wherein the hydraulic fracturing fluid has the proppant for at least a portion of time of providing the hydraulic fracturing fluid through the wellbore into the subterranean formation. The method may include providing a slickwater fracturing fluid through the wellbore into the subterranean formation before providing the hydraulic fracturing through the wellbore into the subterranean formation. In implementations, the slickwater fracturing fluid may have an oxidizer, and wherein the present hydraulic fracturing fluid includes proppant. The method may include providing a $CO_2$-based fracturing fluid through the wellbore into the subterranean formation before or after the providing the hydraulic fracturing fluid through the wellbore into the subterranean formation. If so, the $CO_2$-based fracturing fluid in some implementations may have an oxidizer that oxidizes the organic material.

Yet other embodiments include a hydraulic fracturing fluid for hydraulic fracturing a subterranean formation. The hydraulic fracturing fluid includes: (1) water at less than 50 vol % of the hydraulic fracturing fluid; (2) a fluid (e.g., inert and/or immiscible with water) at greater than 45 vol % (at least 45 vol %) of the hydraulic fracturing fluid; (3) an inorganic oxidizer in the water at a molality of at least 10 mM in the water; and (4) a surfactant. The inorganic oxidizer in the water may be an alkali salt having an anion comprising bromate, chlorate, perchlorate, chlorite hypochlorite, persulfate, iodate, bromite, perborate, dichromate, permanganate, ferrate, percarbonate, nitrite, or nitrate. The concentration of the fluid in the hydraulic fracturing fluid may be at least 65 vol %, and wherein concentration of the water in the hydraulic fracturing fluid may be less than 30 vol %. The hydraulic fracturing fluid may include an internal phase having the fluid and an external aqueous phase having the water and the inorganic oxidizer, and wherein the external aqueous phase is a continuous phase of the hydraulic fracturing fluid. On the other hand, the hydraulic fracturing fluid may have an external phase having the fluid and an internal aqueous phase having the water and the inorganic oxidizer, and wherein the external phase is a continuous phase of the hydraulic fracturing fluid. The fluid may be a nonpolar fluid and is in a non-aqueous phase of the hydraulic fracturing fluid. The fluid may be an inert gas, such as carbon dioxide ($CO_2$), nitrogen ($N_2$), ethane, propane, butane, or argon, or mixtures thereof. If so, the fluid may further include a reactive gas as an oxidizer, such as chlorine dioxide, bromine, ozone, or chlorine. In other implementations, the fluid may include oil, liquid $CO_2$, or supercritical $CO_2$. If so, the fluid may further include an organic oxidizer. The organic oxidizer may include an organic cation and an inorganic anion. The inorganic anion may include bromate, chlorate, perchlorate, chlorite hypochlorite, persulfate, iodate, bromite, perborate, dichromate, permanganate, ferrate, percarbonate, or nitrite. The organic oxidizer may include a quaternary ammonium salt comprising an anion comprising bromate, chlorate, perchlorate, chlorite hypochlorite, persulfate, iodate, bromite, perborate, dichromate, permanganate, ferrate, percarbonate, or nitrite. The organic oxidizer include a salt having an cation paired with an anion, wherein the cation comprises pyridinium, pyrrolidinium, bis(triphenylphosphine)iminium, imidazolium, or tetraphenylphosphonium, and wherein the anion comprising bromate, chlorate, perchlorate, chlorite hypochlorite, persulfate, iodate, bromite, perborate, dichromate, permanganate, ferrate, percarbonate, or nitrite.

The hydraulic fracturing fluid may be a foam, an emulsion, a foamed emulsion, or a liquid-carrying gas. The surfactant may promote formation of the hydraulic fracturing fluid as a foam, an emulsion, a foamed emulsion, or a liquid-carrying gas, and wherein the surfactant may be less than 5 vol % of the hydraulic fracturing fluid. The concentration of the surfactant may be in a range of 0.03 weight percent (wt %) to 2.5 wt % of liquid in the hydraulic fracturing fluid. In some implementations, the surfactant is fluorinated. In other implementations, the surfactant may be an amphilic block copolymer that functions as a surfactant in the hydraulic fracturing fluid. The hydraulic fracturing fluid may have a viscosifier including a polysaccharide that increases viscosity of the hydraulic fracturing fluid, and wherein concentration of the surfactant is in a range of 0.3 gallon to 25 gallons per 1000 gallons of liquid in the hydraulic fracturing fluid.

Yet another embodiment is a method of hydraulic fracturing including providing a hydraulic fracturing fluid through a wellbore into a subterranean formation to hydraulically fracture the subterranean formation. The hydraulic fracturing fluid includes water, an inert gas or liquid, and a surfactant. The hydraulic fracturing fluid includes at least one oxidizer. The at least one oxidizer includes an inorganic oxidizer in the water. The method includes oxidizing organic material in the subterranean formation with the hydraulic fracturing fluid.

Yet another embodiment is a method of hydraulic fracturing including providing a hydraulic fracturing fluid that is reactive (e.g., oxidizing) through a wellbore into a subterranean formation to hydraulically fracture the subterranean formation. The hydraulic fracturing fluid may be a reactive foam (e.g., oxidizing foam). The hydraulic fracturing fluid may be a reactive emulsion (e.g., oxidizing emulsion). The hydraulic fracturing fluid may be a reactive foamed emulsion (e.g., oxidizing foamed emulsion). The reactive foam (if formed) has a gas phase (having inert gas) and an aqueous phase (having water and an inorganic oxidizer). The gas phase may optionally include a reactive gas as an oxidizer. The method includes oxidizing organic material (including kerogen) in the subterranean formation with the hydraulic fracturing fluid. The oxidizing of the organic material degrades the organic material.

Yet another embodiment relates to method of hydraulic fracturing including pumping a hydraulic fracturing fluid through a wellbore into a subterranean formation to hydraulically fracture the subterranean formation to form hydraulic fractures in the subterranean formation. The hydraulic fracturing fluid includes water, an inert fluid, and an inorganic oxidizer in the water. The method includes adding a surfactant to the hydraulic fracturing fluid to give the hydraulic fracturing fluid as an oxidizing foam, oxidizing emulsion, or oxidizing foamed emulsion. The oxidizing foam (if formed) includes an aqueous phase (having the water and the inorganic oxidizer) and a gas phase (having the inert fluid that is an inert gas). The hydraulic fracturing fluid may optionally include a second oxidizer, such as in the gas phase. For the implementation of the hydraulic fracturing fluid as an oxidizing foam, the inert gas is at least 45 vol % or at least 50 vol % of the hydraulic fracturing fluid. The method includes oxidizing organic material in the subterranean formation with the hydraulic fracturing fluid.

Yet another embodiment is a hydraulic fracturing fluid for hydraulic fracturing a subterranean formation. The hydraulic fracturing fluid is reactive (e.g., oxidizing). The reactive hydraulic fracturing fluid includes water at less than 50 vol % of the hydraulic fracturing fluid, an inert fluid that is at least 50 vol % of the hydraulic fracturing fluid, an inorganic oxidizer in the water at a molality of at least 10 mM in the water, and a surfactant that promotes formation of the hydraulic fracturing fluid as a foam, emulsion, foamed emulsion, or liquid-carrying gas. In implementations, the hydraulic fracturing fluid may optionally include an oxidizer in the inert fluid.

A number of implementations have been described. Nevertheless, it will be understood that various modifications may be made without departing from the spirit and scope of the disclosure.

What is claimed is:

1. A hydraulic fracturing fluid for hydraulic fracturing a subterranean formation, the hydraulic fracturing fluid comprising:
    water at less than 50 volume percent (vol %) of the hydraulic fracturing fluid;
    a nonpolar fluid at greater than 45 vol % of the hydraulic fracturing fluid;
    an inorganic oxidizer in the water at a molality of at least 10 millimolar (mM) in the water;
    an organic oxidizer in the nonpolar fluid, the organic oxidizer comprising an organic cation and an inorganic anion; and
    a surfactant.

2. The hydraulic fracturing fluid of claim 1, wherein the nonpolar fluid comprises oil, liquid $CO_2$, or supercritical $CO_2$ as a non-aqueous phase of the hydraulic fracturing fluid, and wherein the hydraulic fracturing fluid comprises an emulsion of the water with the oil, liquid $CO_2$, or supercritical $CO_2$.

3. The hydraulic fracturing fluid of claim 2, wherein the nonpolar fluid comprises an inert gas comprising carbon dioxide ($CO_2$), nitrogen ($N_2$), ethane, propane, butane, or argon, or mixtures thereof, and wherein the hydraulic fracturing fluid comprises a foamed emulsion.

4. The hydraulic fracturing fluid of claim 3, wherein the organic oxidizer is in the oil, liquid $CO_2$, or supercritical $CO_2$, and wherein a reactive gas as an oxidizer is in the inert gas, the reactive gas comprising chlorine dioxide ($ClO_2$), bromine ($Br_2$), ozone, or chlorine ($Cl_2$).

5. The hydraulic fracturing fluid of claim 2, wherein the surfactant promotes formation of the hydraulic fracturing fluid as the emulsion, and wherein the surfactant is less than 5 vol % of the hydraulic fracturing fluid.

6. The hydraulic fracturing fluid of claim 1, wherein the nonpolar fluid is immiscible with the water, and wherein the inorganic oxidizer comprises an alkali salt having an anion comprising bromate, chlorate, perchlorate, chlorite hypochlorite, persulfate, iodate, bromite, perborate, dichromate, permanganate, ferrate, percarbonate, nitrite, or nitrate.

7. The hydraulic fracturing fluid of claim 1, wherein the inorganic anion comprises bromate, chlorate, perchlorate, chlorite hypochlorite, persulfate, iodate, bromite, perborate, dichromate, permanganate, ferrate, percarbonate, or nitrite.

8. The hydraulic fracturing fluid of claim 1, wherein the organic oxidizer comprises a quaternary ammonium salt comprising the inorganic anion comprising bromate, chlorate, perchlorate, chlorite hypochlorite, persulfate, iodate, bromite, perborate, dichromate, permanganate, ferrate, percarbonate, or nitrite.

9. The hydraulic fracturing fluid of claim 1, wherein the organic oxidizer comprises a salt comprising the organic cation paired with the inorganic anion, wherein the organic cation comprises pyridinium, pyrrolidinium, imidazolium, bis(triphenylphosphine)iminium, or tetraphenylphosphonium, and wherein the inorganic anion comprises bromate, chlorate, perchlorate, chlorite hypochlorite, persulfate, iodate, bromite, perborate, dichromate, permanganate, ferrate, percarbonate, or nitrite.

10. The hydraulic fracturing fluid of claim 1, wherein the surfactant is fluorinated.

11. The hydraulic fracturing fluid of claim 1, wherein the surfactant comprises an amphilic block copolymer that functions as a surfactant in the hydraulic fracturing fluid.

12. The hydraulic fracturing fluid of claim 1, wherein the hydraulic fracturing fluid comprises a viscosifier comprising a polysaccharide that increases viscosity of the hydraulic fracturing fluid.

13. The hydraulic fracturing fluid of claim 1, wherein the hydraulic fracturing fluid comprises an internal phase comprising the nonpolar fluid and an external aqueous phase comprising the water and the inorganic oxidizer, and wherein the external aqueous phase is a continuous phase of the hydraulic fracturing fluid.

14. A hydraulic fracturing fluid for hydraulic fracturing a subterranean formation, the hydraulic fracturing fluid comprising:
 water at less than 50 volume percent (vol %) of the hydraulic fracturing fluid;
 nonpolar fluid at greater than 45 vol % of the hydraulic fracturing fluid, wherein the nonpolar fluid comprises an inert gas comprising carbon dioxide ($CO_2$), nitrogen ($N_2$), ethane, propane, butane, or argon, or mixtures thereof;
 a reactive gas included in the inert gas as an oxidizer, the reactive gas comprising chlorine dioxide ($ClO_2$), bromine ($Br_2$), ozone, or chlorine ($Cl_2$);
 an inorganic oxidizer in the water at a molality of at least 10 millimolar (mM) in the water; and
 a surfactant.

15. The hydraulic fracturing fluid of claim 14, wherein the nonpolar fluid is immiscible with the water, and wherein the reactive gas comprises $ClO_2$, ozone, or $Cl_2$.

16. The hydraulic fracturing fluid of claim 14, wherein concentration of the nonpolar fluid in the hydraulic fracturing fluid is at least 65 vol %, and wherein concentration of the water in the hydraulic fracturing fluid is less than 30 vol %.

17. The hydraulic fracturing fluid of claim 16, wherein the hydraulic fracturing fluid comprises an external phase comprising the nonpolar fluid and an internal aqueous phase comprising the water and the inorganic oxidizer, and wherein the external phase is a continuous phase of the hydraulic fracturing fluid.

18. The hydraulic fracturing fluid of claim 14,
 wherein the hydraulic fracturing fluid is a foam, or
 wherein the nonpolar fluid further comprises oil, liquid $CO_2$, or supercritical $CO_2$ that forms an emulsion with the water, and the hydraulic fracturing fluid is a foamed emulsion.

19. The hydraulic fracturing fluid of claim 18, wherein the surfactant promotes formation of the hydraulic fracturing fluid as the foam or the foamed emulsion, and wherein the surfactant is less than 5 vol % of the hydraulic fracturing fluid.

20. The hydraulic fracturing fluid of claim 18, wherein the hydraulic fracturing fluid is the foamed emulsion, and wherein an organic oxidizer comprising an organic cation and inorganic anion is in the oil, liquid $CO_2$, or supercritical $CO_2$.

* * * * *